United States Patent
Tanaka et al.

(10) Patent No.: US 6,504,824 B1
(45) Date of Patent: Jan. 7, 2003

(54) APPARATUS AND METHOD FOR MANAGING RATE BAND

(75) Inventors: Jun Tanaka, Kanagawa (JP); Takaaki Wakisaka, Hyogo (JP); Tomohiro Ishihara, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/235,934

(22) Filed: Jan. 22, 1999

(30) Foreign Application Priority Data

Jul. 15, 1998 (JP) .......................... 10-200497

(51) Int. Cl.[7] ............................ H04L 1/00; H04L 12/56
(52) U.S. Cl. ..................... 370/252; 370/395.1; 370/412
(58) Field of Search ................. 370/230, 232, 370/252, 391, 394, 397, 395.1, 395.71, 395.41, 395.4, 521, 524, 413, 412

(56) References Cited

U.S. PATENT DOCUMENTS

| | | | | |
|---|---|---|---|---|
| 6,084,857 A | * | 7/2000 | Takamichi | 370/236 |
| 6,137,779 A | * | 10/2000 | Miller et al. | 370/236 |
| 6,167,049 A | * | 12/2000 | Pei et al. | 370/395 |
| 6,246,687 B1 | * | 6/2001 | Siu | 370/395 |

FOREIGN PATENT DOCUMENTS

| | | | |
|---|---|---|---|
| JP | 8-125669 | * | 5/1996 |
| WO | 95/03657 | * | 2/1995 |

* cited by examiner

Primary Examiner—Alpus H. Hsu
Assistant Examiner—Duc Ho
(74) Attorney, Agent, or Firm—Katten Muchin Zavis Rosenman

(57) ABSTRACT

A re-calculator circuit obtains the MCR value of each connection stored in an MCR storage unit, and performs a calculation in such a way as to impartially distribute the available rate band of a FIFO among active connections. The re-calculator circuit stores a rate band attached to the MCR value of each active connection by this calculation, in a virtual MCR storing unit as a virtual MCR value. This rate measurement unit refers to the virtual MCR value stored in the virtual MCR storage unit, and judges whether or not the input cell rate of each active connection exceeds the virtual MCR value. This result is inputted to an input control unit. The input control unit examines the input cell rate information and congestion monitoring information inputted from a queue length monitor unit for monitoring the volume of cells buffered in the FIFO, and determines whether to discard the incoming cell or to input the cell to the FIFO.

51 Claims, 26 Drawing Sheets

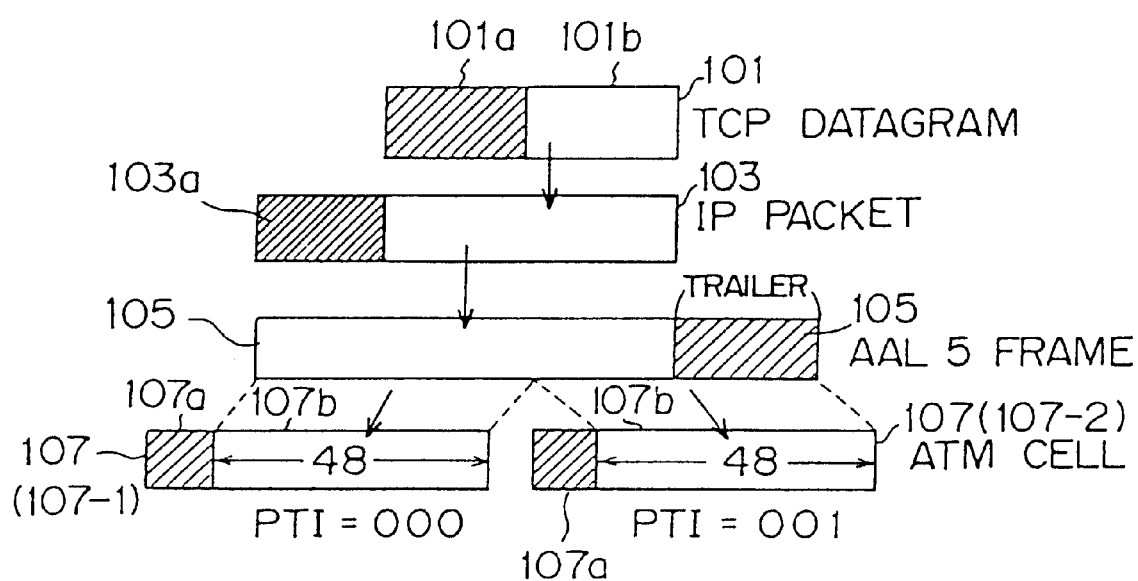
F I G. 8

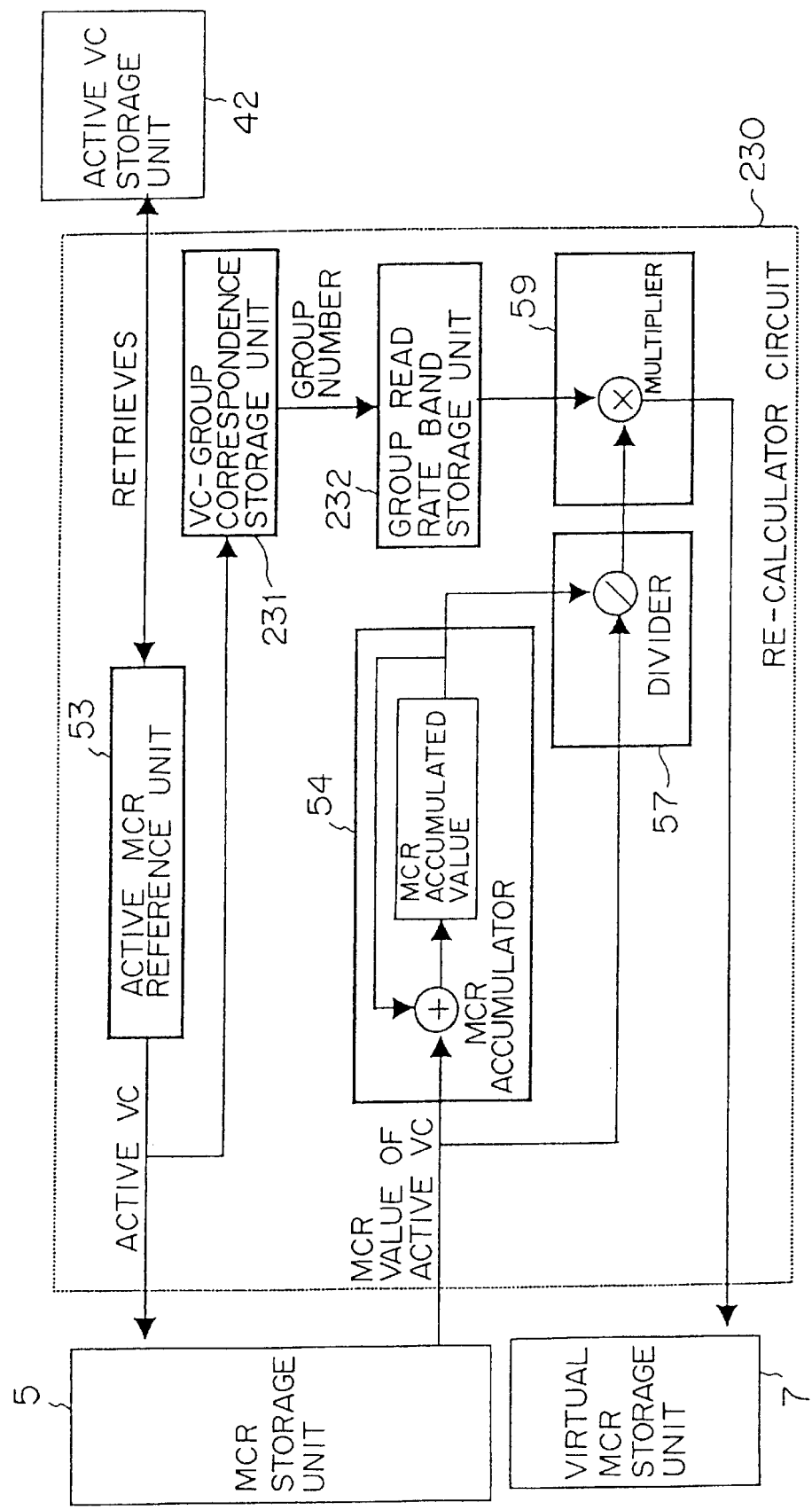
F I G. 25

APPARATUS AND METHOD FOR MANAGING RATE BAND

BACKGROUND OF THE INVENTION

1. Field of the Invention

The present invention relates to an apparatus and a method for guaranteeing the minimum cell rate of each connection accommodated in a communication network.

2. Description of the Related Art

These days, along with the development of information apparatuses, a variety of items of information have been exchanged between these apparatuses through a communication network. In a conventional communication network, as represented by a telephone system, the main target of communication is speech, and the required transmission rate of information is not so high. However, when so-called multimedia information, such as speech, pictures, data, etc. are exchanged using an information apparatus, transmission capability required by a communication network varies depending on the characteristic of each information. When the multimedia information, such as speech, pictures, data, etc. are exchanged at high speed, the transmission rate of a communication network has to be very high. Taking such demands into consideration, a broadband ISDN (B-ISDN) system has a bright future ahead as a communication system for integrating and accommodating a variety of media information, such as speech, pictures, data, etc. In particular, an asynchronous transfer mode (ATM) is a central transmission technology of the broadband ISDN, and the research and development of ATM communication apparatuses, such as an ATM exchange employing this technology, etc. are actively made by every telecommunications manufacturer.

Currently, the standardization of a guaranteed frame rate (GFR) is promoted as a new service class for efficiently accommodating high-burst communications into an ATM network, in the Telecommunication Committee of International Telecommunication Union (ITU-T), ATM-Forum, etc. The GFR guarantees a user the throughput of data at a rate up to a minimum cell rate (MCR) reported by the user, and when a line is empty, the user can also transfer data at a rate exceeding the MCR. One of the features of the GFR is that network resources can be efficiently utilized by sharing a rate band with a plurality of connections and simultaneously the minimum service described above can be guaranteed.

There are roughly the following two methods of controlling a cell input rate needed to implement this.

(1) A first-in first-out (FIFO) buffer for accommodating cells with a plurality of connections is adopted, and if the volume of cells staying unprocessed exceeds a certain threshold, cells other than those with up to an MCR are not inputted to the FIFO in each connection.

(2) A buffer for storing cells is provided individually for each connection, and the cells are read from the individual buffer at intervals of at least 1/MCR.

In a FIFO type GFR as described in the above (1), input traffic is measured for each connection, tagging is performed for cells with a connection made at the rate exceeding an MCR, and the FIFO discards on input, cells meeting the following two conditions.

Cells, if the amount of buffered cells exceeds a certain threshold

Cells which are tagged

FIG. 1 shows the configuration of an apparatus providing a conventional FIFO type GFR.

In the conventional FIFO type GFR, using both congestion monitoring information b from a queue length monitor unit 273 for monitoring whether or not the volume of cells queued in the FIFO 272 exceeds the threshold, and rate-over information a (information indicating whether or not an incoming cell has been transmitted at a rate exceeding the MCR) from a rate measurement unit 271, an input control unit 274 controls the input of cells into a FIFO 272 by turning on/off a switch 276. The rate measurement unit 271 measures the number of cells corresponding to the MCR of each connection (number of MCR cells) set for each connection, and judges whether or not the input cell rate of each connection exceeds the MCR while searching and referring to an MCR storage unit 275 (usually composed of memories).

The rate measurement unit 271, for example, comprises for each connection a counter 282 for counting down, with cells of a number corresponding to the MCR as shown in FIG. 2 as an initial value every time a cell is input. The rate measurement unit 271 also comprises a connection identification unit 281 for identifying a connection based on an identifier set in the header of the cell, such as a virtual path identifier (VPI), a virtual channel identifier (VCI), etc. The rate measurement unit 271 outputs the rateover information a with an incoming cell, after the count value of the counter 282 becomes "0" as a cell with a rate exceeding the MCR of a connection which has transmitted the incoming cell. The counter value of the counter 282 is reset at a predetermined constant time, and a number of cells corresponding to the MCR of a corresponding connection is set in the counter 282 again as an initial value.

The queue length monitor unit 273 compares the queue length of the FIFO 272 with a predetermined threshold, and judges whether or not the number of cells stored in the FIFO 272 exceeds the threshold, that is, for example, if the FIFO 272 is about to overflow. The queue length monitor unit 273 can be easily composed using comparators.

According to the configuration described above, if a rate is less than the MCR, all the cells of each connection are inputted to the FIFO 272, and share among the connections "a rate band exceeding the sum of the MCR of each connection" (hereinafter called "available rate band") out of the allowable rate bands of the FIFO 272.

Therefore, if there is no available rate band, a rate band up to the MCR reported by each connection can be used, and as a result, fairness is improved. Generally speaking, the sum of the MCRs of each connection becomes less than the read rate of the FIFO 272 (in order to guarantee the MCR of each connection). Therefore, when there is a connection not communicating, the MCR becomes an available rate band for other connections.

An MCR can be guaranteed by either of the above methods (1) and (2). However, when a FIFO is used, a buffer is shared with a plurality of connections, and the part of a rate band exceeding the MCR is occupied by each connection in proportion to the input rate of the FIFO, which is a problem from the viewpoint of impartiality among users. That is, how to distribute an available rate band among the connections is not predetermined, and the part exceeding the MCR of cells inputted to the FIFO are left to be occupied by arbitrary incoming cells. Therefore, there is a possibility that a connection transmitting the largest volume of cells to the FIFO at a certain time may occupy the FIFO. That means that, even a connection with a low MCR value often can use the FIFO more frequently than a connection with a high MCR value, that is, even a connection with a low MCR value can transmit cells at a higher rate, which causes an unfair.

However, since a FIFO can be configured more easily and a necessary buffer capacity can be made less than an individual buffer by the effect of sharing, the FIFO is useful as means for implementing a GFR, only if fairness among users can be implemented.

SUMMARY OF THE INVENTION

It is an object of the present invention to provide an apparatus and a method for making more efficient use of network resources possible in a network by fairness distributing an available rate band between the connections while guaranteeing an MCR for each connection.

The rate band managing apparatus of the present invention for guaranteeing the MCR of each of connections accommodated in a network, comprises a re-calculator unit for re-calculating an MCR value to be guaranteed for each of the connections according to a predetermined rule and obtaining the virtual MCR (re-calculated MCR) of each of the connections, and a control unit for guaranteeing the MCR of each of the connections using the virtual MCR of each of the connections.

The rate band managing method of the present invention is a rate band managing method for guaranteeing the MCR of each of connections accommodated in a network, and comprises the steps of (a) re-calculating the MCR value to be guaranteed for each of connections according to a predetermined rule and obtaining the virtual MCR of each of the connections and (b) guaranteeing the MCR of each of the connections using the virtual MCR of each of the connections.

According to the present invention, an MCR agreed between a user and a network at the time of the establishment of a connection is not used as a fixed value, but if there is an available rate band, a wider rate band can be used by each of active connections according to the use condition of the network resource by distributing the available rate band among the connections by a predetermined method. Thus, the rate band of a communication network can be more efficiently used, and simultaneously an available rate band can be impartially distributed among the connections, compared with a conventional method in which the management of an available rate band is not performed.

BRIEF DESCRIPTION OF THE DRAWINGS

FIG. 8 explains the data structure of each layer.

FIG. 25 shows a sixth configuration of a re-calculator circuit.

DESCRIPTION OF THE PREFERRED EMBODIMENTS

The detailed preferred embodiments of the present inventions are described below with reference to the drawings.

The preferred embodiments of the present invention realize the fairness among connections in a FIFO type GFR service. That is, for example, in the preferred embodiments, users can be always provided with the impartial sharing of a rate band by searching only for connections in communication (hereinafter called "active connections") and by "changing the MCR of each active connection in such a way that there is no available rate band". For this purpose, an MCR set up at the time of the establishment of a connection is re-calculated for each connection according to a certain criterion, the number of cells to be inputted to a FIFO of each active connection is controlled using the result, and the impartiality among users is improved.

Figure 3:
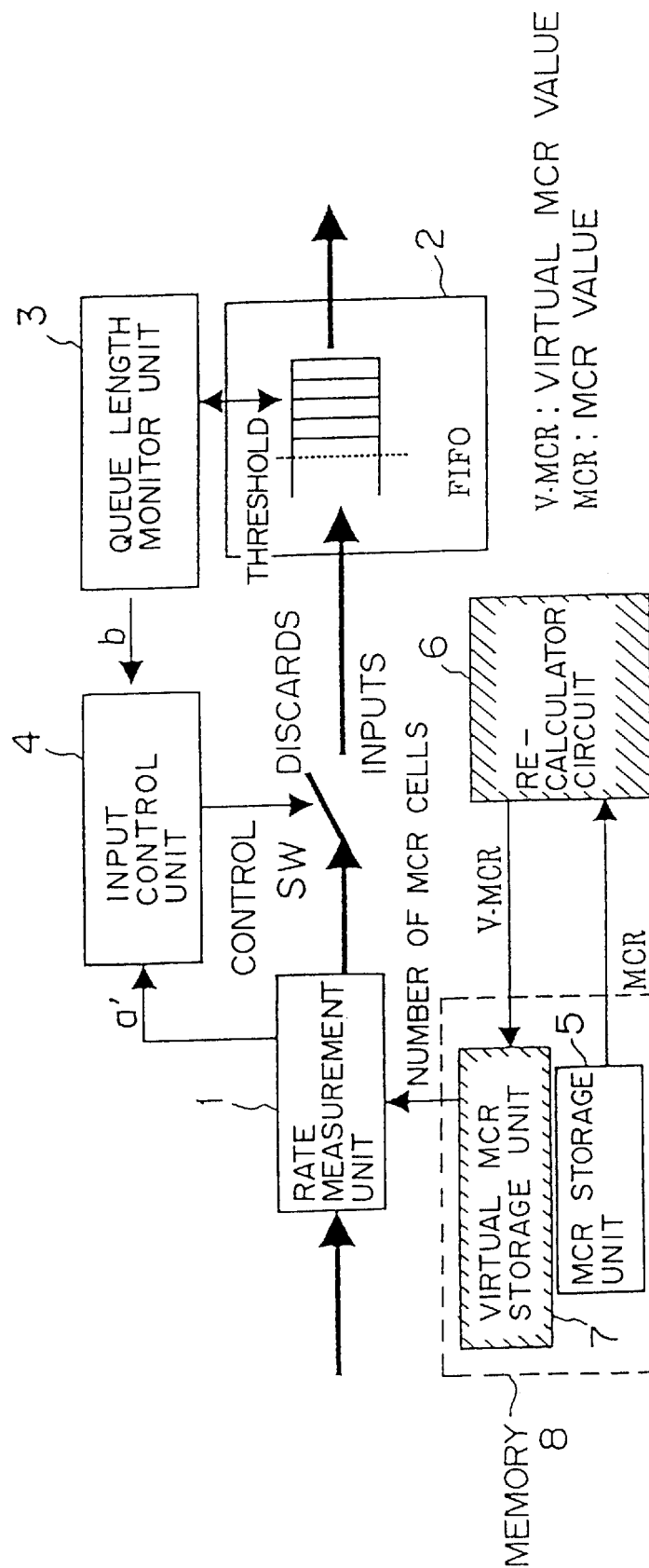
FIG. 3 shows the configuration of the rate band managing apparatus of a first preferred embodiment with an MCR re-calculating function to impartially distribute an available rate band among active connections.

FIG. 3 shows the configuration of a first preferred embodiment with an MCR re-calculating function needed to realize the impartiality described above. Thick lines in FIG. 3 indicate the flow of a main signal (cell, etc.), and thin lines that of a control signal.

One of the features of the preferred embodiment shown in FIG. 3 is that a rate measurement unit 1 controls the number of cells to be inputted to a FIFO 2, not by directly referring to an MCR storage unit 5 for storing an MCR value reported by a user at the time of the establishment of a connection, but by referring to a virtual MCR value calculated from the MCR value by a re-calculator circuit 6 (referring to a virtual MCR storage unit 7 storing the virtual MCR value). Hashed components of FIG. 3 indicate components newly provided in this preferred embodiment compared to the prior art.

Both the MCR storage unit 5 and virtual MCR storage unit 7, for example, store the MCR value of each connection corresponding to the VC number.

Although the MCR storage unit 5 and virtual MCR storage unit 7 are individually described in FIG. 3, they can also be configured by one memory 8. In this case, each of an MCR and the virtual MCR can be designed to be suitably read by accessing the memory 8. The same applies to the other preferred embodiments.

The detailed description of the calculation algorithm of the re-calculator unit 6 is omitted here, and is described later. The conceptual function of the re-calculator unit 6 is as follows. The re-calculator unit 6 re-calculates a virtual MCR value, which is obtained by impartially distributing the available rate band of the FIFO 2 among active connections for each of the active connections according to the use condition of a actual connection, and stores the result of the re-calculation in the virtual MCR storage unit 7. The rate measurement unit 1 reads this re-calculated virtual MCR value from the virtual MCR storage unit 7, and based on the read value determines whether to discard incoming calls or input them to the FIFO 2.

Conventionally, since only MCR values requested by users are used, no special control is made over cells with a flow rate exceeding an MCR. In this preferred embodiment, to impartially distribute the available rate band of the FIFO 2 among active connections according a predetermined method, a virtual value (virtual MCR value) corresponding to an MCR value is calculated by the re-calculator circuit 6, this value is regarded as a real MCR, and the flow rate of cells is controlled accordingly.

As described regarding the related art, the rate measurement unit 1 measures the flow rate of cells to be inputted for each connection, judges whether or not the flow rate exceeds a virtual MCR value stored in the virtual MCR storage unit 7, and if there is a connection transmitting cells at a rate exceeding the virtual MCR value, reports the information a' to an input control unit 4. The input control unit 4 judges from both the above information a' and information b' inputted from a queue length monitor unit 3 for monitoring the number of cells buffered in the FIFO 2, whether or not an inputted call should be accepted by the FIFO 2. When a cell whose flow rate exceeds the virtual MCR value, is inputted from a certain connection and the FIFO 2 would overflow (cells of a number more than the threshold of the FIFO 2 are buffered) if the cell is inputted, the input control unit 4 executes the process of discarding the cell. When the rate of an inputted cell in each connection is less than the virtual MCR value or there is capacity in the of FIFO 2, the cell is inputted to the FIFO 2.

The rate measurement unit 1 processes a cell by not referring to the MCR value being a value requested by a user but always referring to the virtual MCR value calculated by the re-calculator circuit 6. The MCR value requested by the user and stored in the MCR storage unit 5 is used when the re-calculator unit 6 calculates the virtual MCR value. This virtual MCR value is stored in the virtual MCR storage unit 7, and when there is an available rate band, generally speaking, the virtual MCR value is greater than the MCR value. When there is no available rate band and all connections are active, general speaking, the virtual MCR value and the MCR value become equal.

Figure 4:
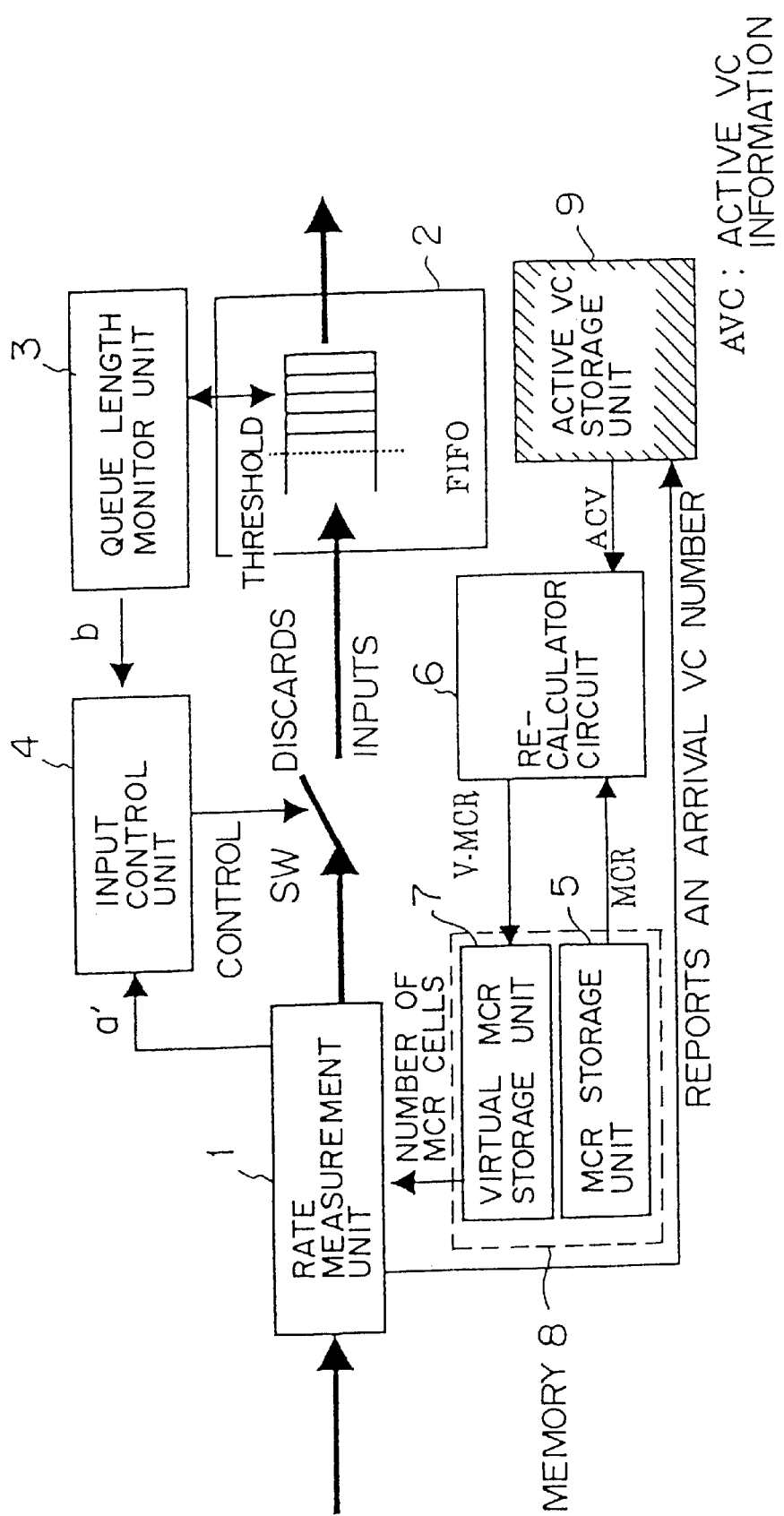
FIG. 4 shows the configuration of the second preferred embodiment of the present invention.

FIG. 4 shows the system configuration of a rate band managing apparatus being the second preferred embodiment of the present invention.

In FIG. 4, the same reference numbers are attached to the same components as those shown in FIG. 3.

Figure 1:
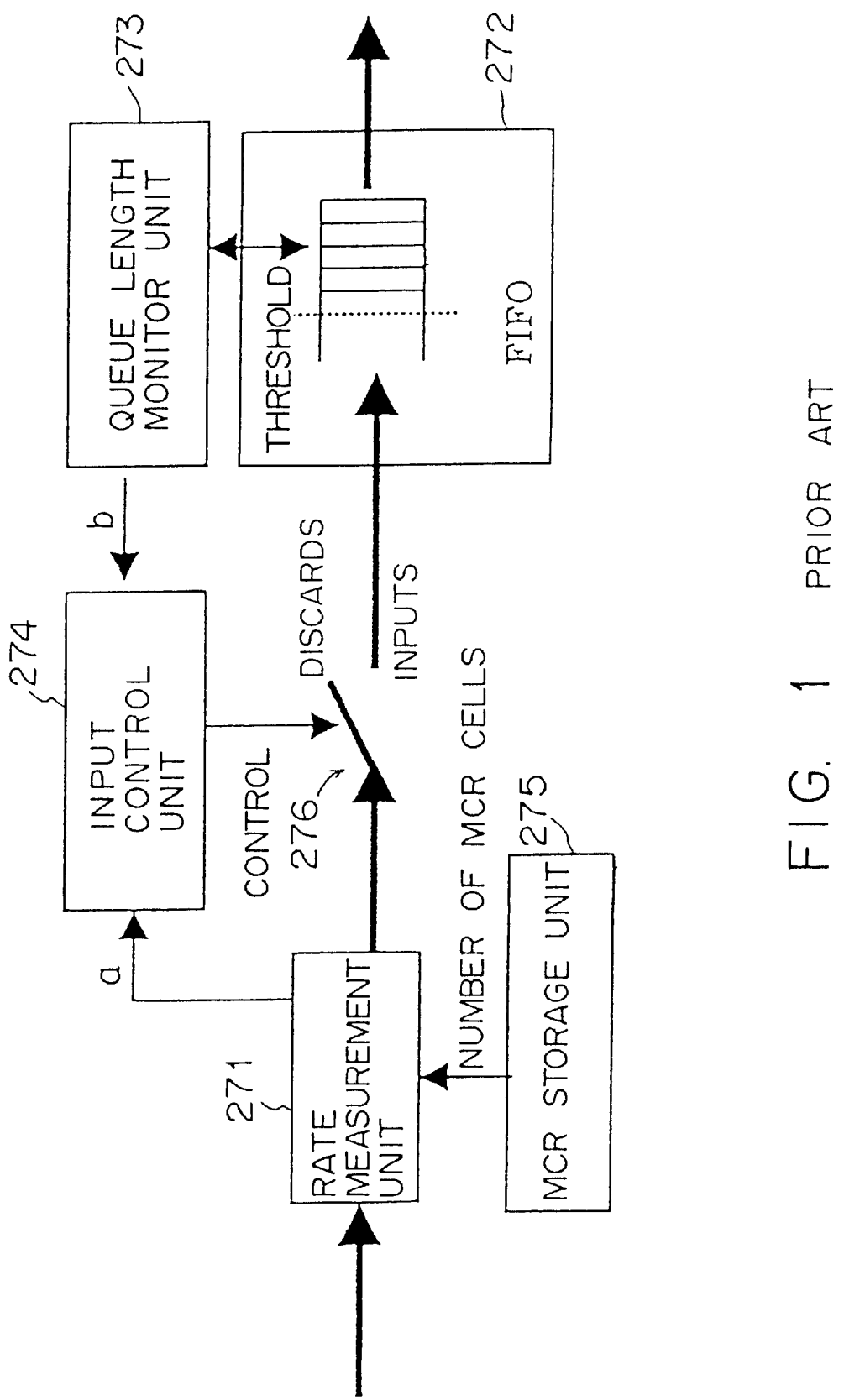
FIG. 1 shows the configuration of an apparatus for providing a conventional FIFO type GFR.
Figure 2:
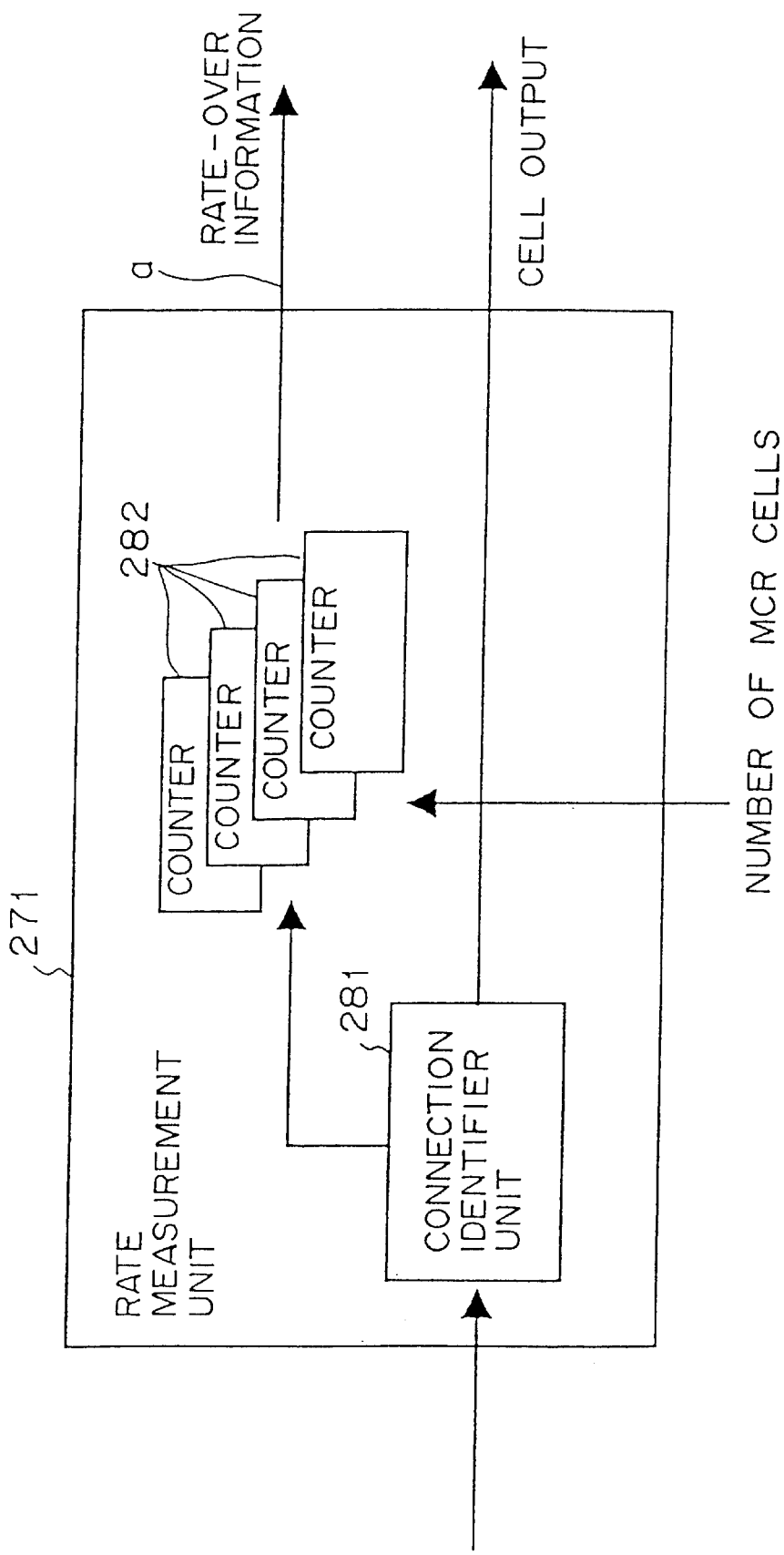
FIG. 2 shows the configuration of a conventional rate measurement unit.

In the re-calculation of an MCR, an active connection and a non-active connection have to be distinguished. The preferred embodiment shown in FIG. 2 comprises an active virtual connection (VC) storage unit 9 for storing whether or not each connection is active (in an actual communication) (here a VC means is equivalent to a connection).

The VC identification number of a cell inputted from the rate measurement unit 1 is reported to the active VC storage unit 9. For example, if the active VC storage unit 9 is composed of RAMs, the unit 9 is configured in such a way that by setting an "effective bit" in the active VC storage unit 9 having received the cell, etc. and referring to the active VC storage unit 9, which connections are active can be found when the re-calculator circuit 6 calculates a virtual MCR. The re-calculator circuit 6 refers to the active VC storage unit 9, selects only the MCR values of active connections which are stored in the MCR storage unit 5, calculates the virtual MCR value of each of the active connections using the MCR values, and writes the virtual MCR values in the virtual MCR storage unit 7.

Since the rate measurement unit 1 counts down the number of inputted cells for each connection using counters provided for each connection, every time a cell is inputted, the count value of a counter corresponding to a connection transmitting the cell is decremented, and at which connection the cell arrives (which connection is active) can be known. The unit 1 is configured in such a way as to report this information to the active VC storage unit 9 and to register which connection is active in the active VC storage unit 9. The configuration of the active VC storage unit 9 is not necessarily limited to a configuration such that the active VC storage unit 9 sets an effective bit corresponding to each connection, but the active VC storage unit 9 can also be configured in such a way as to judge which connection is active. For example, a table can also be configured in such a way that an effective bit is not used, only the VC number (for example, the value of a VCI) of an active connection is registered and when the connection becomes non-active, the VC number of a corresponding connection is deleted.

The re-calculator circuit 6 obtains the identifier (VC number) of an active connection from the active VC storage unit 9, and obtains an MCR value corresponding the identifier from the MCR storage unit 5. Then, after performing a predetermined calculation, described later, the re-calculator circuit 6 stores the calculation result in the virtual MCR storage unit 7 as a virtual MCR value. The rate measurement unit 1 refers to the virtual MCR value calculated in this way, and transmits rate-over information a' to the input control unit 4. According to both the rate-over information a' and congestion monitoring information b obtained from the queue length monitor unit 3 for monitoring the number of cells stored in FIFO 2, the input control unit 4 discards the cell or inputs it to the FIFO 2 by turning on/off the switch SW.

Figure 5:
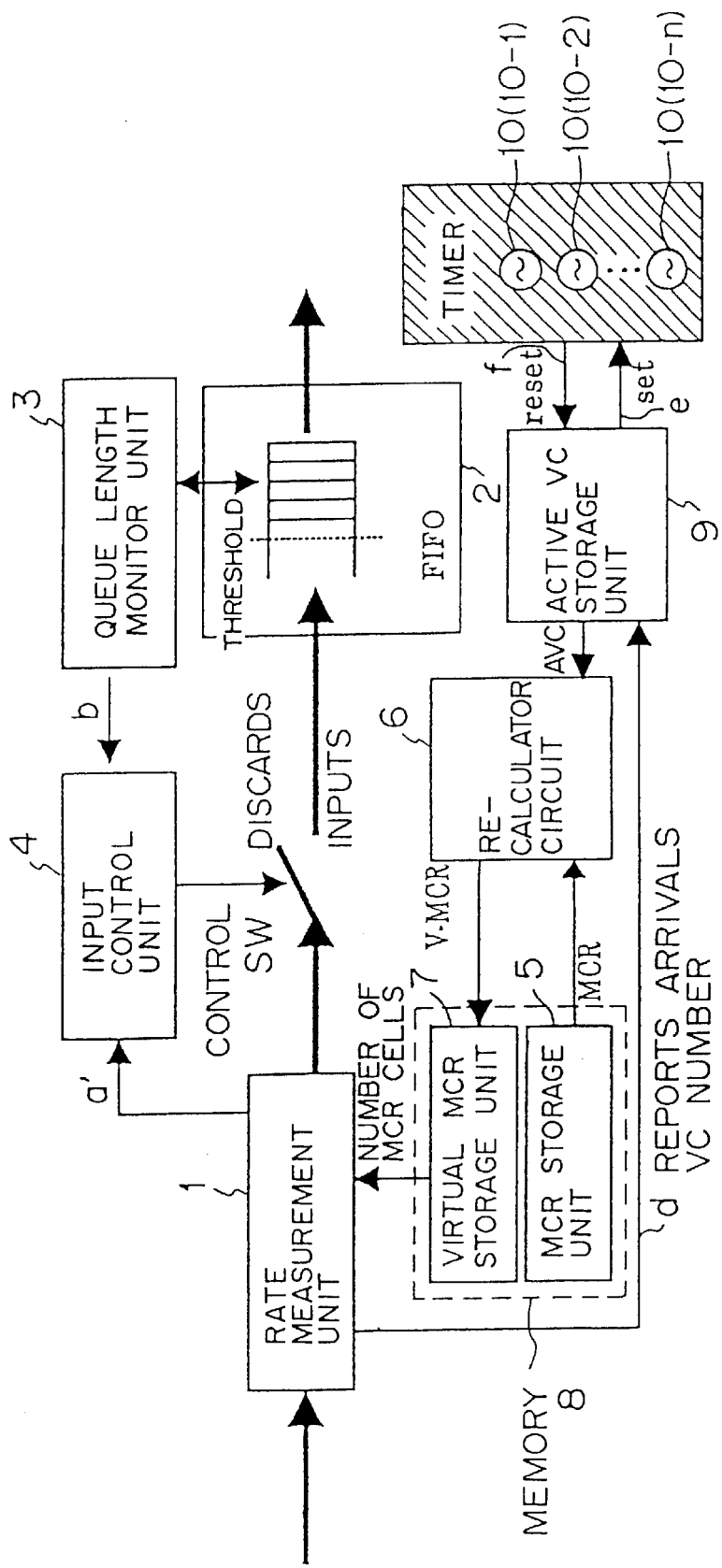
FIG. 5 shows the configuration of the third preferred embodiment of the present invention.

FIG. 5 shows the configuration of a rate band managing apparatus being the third preferred embodiment of the present invention.

In FIG. 5, the same reference numerals are attached to the same components as those shown in FIGS. 3 and 4.

Although in the preferred embodiment shown in FIG. 4, an active VC is added to and stored in the active VC storage unit 9 by the arrival of a cell at the rate measurement unit 1, connections whose communications are completed and which become nonactive have to be deleted from the active VC storage unit 9. The preferred embodiment shown in FIG. 5 is provided with timers 10 (10-1 to 10-n) for each connection, and the timers 10 delete from the active VC storage unit 9 connections whose corresponding timer 10 times out. The timer 10 is reset every time the cell of a corresponding connection arrives at the rate measurement unit (shown as set, in FIG. 5), times out if a next cell does not arrive within a certain time, and then deletes the connection (VC) from the active VC storage unit 9 (shown as reset, in FIG. 5).

That is, every time a cell arrives at the rate measurement unit 1, the rate measurement unit 1 obtains a VC number from the header of the cell and issues an arrival VC number notice d to the active VC storage unit 9 to report the VC number to the active VC storage unit 9. The active VC storage unit 9 is updated every time this notice d is received. Therefore, if cells of the same connection arrive at the rate measurement unit 1 in succession, the rate measurement unit 1 sets an effective bit corresponding to the connection, for example, to "1" each time, or sets up the VC number of the connection. Thus, while the cells of a certain connection arrive at the rate measurement unit 1 at predetermined intervals, an effective bit corresponding to the connection continues to be set to "1" or the VC number of the connection continues to be set up. Furthermore, when receiving an arrival VC number notice d, the active VC storage unit 9 sends a set signal e to a timer 10 corresponding to the connection. Every time a cell of the connection arrives at the rate measurement unit 1, the timer 10 corresponding to the connection is set and the countdown is re-started. Therefore, the timer 10 corresponding to the connection whose cells continue to arrive at the rate measurement unit 1 within a predetermined period, never times out and continues to be set. If a cell of a certain connection does not arrive at the rate measurement unit 1 within the predetermined period, a set signal e is not sent to the timer 10 corresponding to the connection, since during that period the arrival VC number notice d of the connection is not transmitted from the rate measurement unit 1 to the active VC storage unit 9. Therefore, the timer 10 continues to count down during this period, finally the value of the timer becomes "0", and the timer 10 times out. When the timer 10 times out, the timer 10 outputs the reset signal f of the effective bit of the corresponding connection or a deletion notice signal of the corresponding VC number. Then, by the input of either of these signals the effective bit of a connection with the VC number in the active VC storage unit 9 is set to, for example, "0". Alternatively, the VC number of the connection with the VC number is deleted from the active VC storage unit 9.

The re-calculator circuit 6 refers to the active VC storage unit 9 in which a VC number is generated or deleted in the way described above, specifies an active connection, reads the MCR value of the active connection from the MCR storage unit 5, and calculates the virtual MCR value of the active connection. This virtual MCR value is set in the virtual MCR storage unit 7 and is referred to by the rate measurement unit 1. Then, as described earlier, if a certain connection transmits cells at a rate exceeding the virtual MCR value, rate-over information a' regarding the connection is transmitted from the rate measurement unit 1 to the input control unit 4. According to the rate-over information a' together with a congestion monitoring information b obtained from the queue length monitor unit 3, the input control unit 4 discards or inputs to the FIFO 2 the cells arriving at the rate measurement unit 1 by turning on/off the switch SW.

Figure 6:
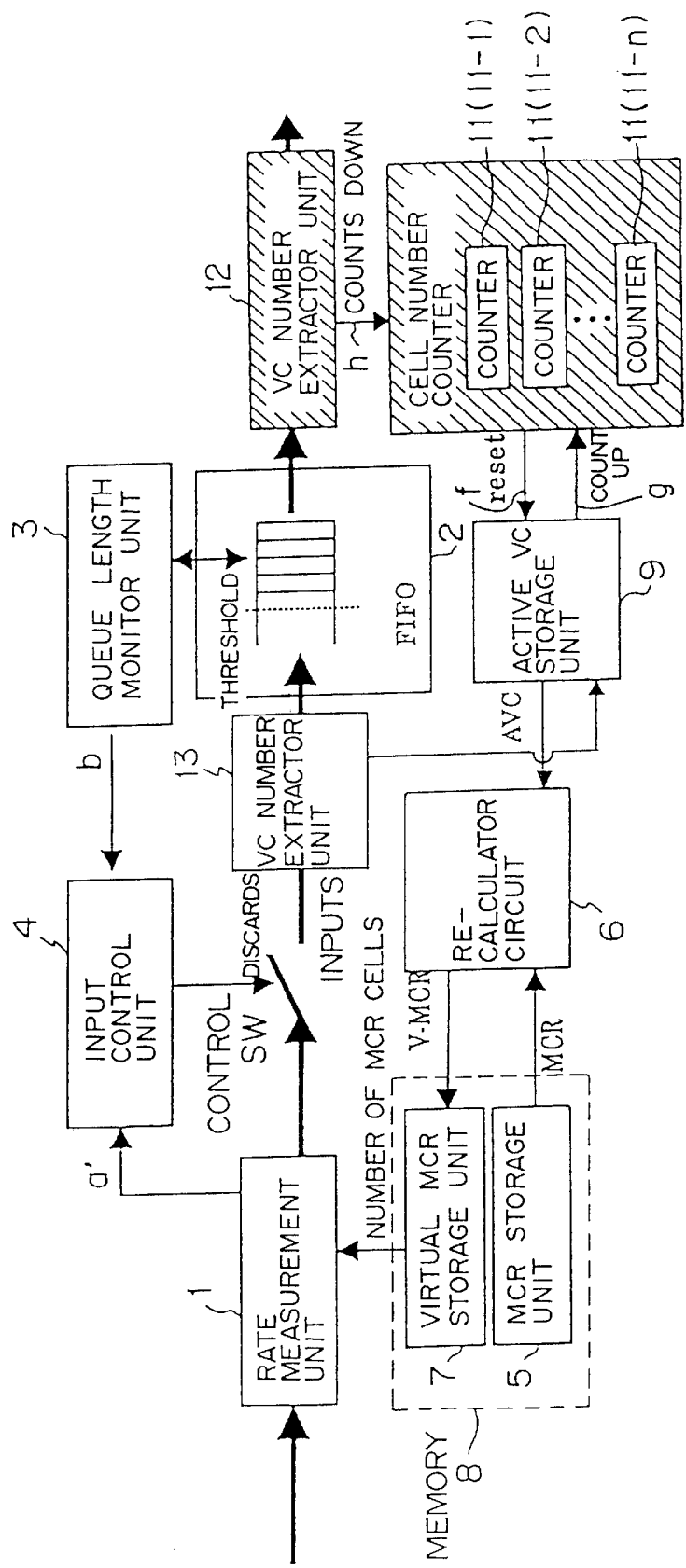
FIG. 6 shows the configuration of the fourth preferred embodiment of the present invention.

FIG. 6 shows the configuration of a rate band managing apparatus being the fourth preferred embodiment of the present invention.

In FIG. 6, the same reference numerals are attached to the same components as those shown in FIG. 5.

In this preferred embodiment, a timer for the detection of non-active connections is not used, the number of cells stored in the FIFO 2 is counted for each connection, and for connections whose number of cells stored in the FIFO 2 is "0", that is, which store no cells in the FIFO 2, the VC number is deleted from the active VC storage 9 or the effective bit of the connection is set to "0". This preferred embodiment is provided with cell number counters 11 (11-1 to 11-n) for each connection, a cell number counter 11 corresponding to a connection transmitting the cell is counted up every time a cell arrives at the rate measurement unit 1, and the cell number counter 11 corresponding to a connection transmitting the cell is counted down every time the cell is read out from the FIFO 2. For this purpose, a first VC number extractor unit 12 is provided on the output side of the FIFO 2, and the first VC number extractor unit 12 reports the VC number read from the FIFO 2 to a corresponding cell number counter 11.

A second VC number extractor unit 13 reports to the active VC storage unit 9 the VC number of a cell inputted to the rate measurement unit 1 through the switch SW. In the manner as described in FIG. 5, the active VC storage unit 9 registers the fact that a connection corresponding to the reported VC number is active. The active VC storage unit 9 also transmits an increment command signal g to the cell number counter 11 provided corresponding to a connection with the reported VC number. Therefore, the cell number counter 11 counts up the number of cells every time the cell of a corresponding connection is inputted to the FIFO 2.

As described above, on the output side of the FIFO 2 the first VC number extractor unit 12 is provided. The first VC number extractor unit 12 comprises the connection identification unit 281 described with reference to FIG. 2, and obtains the VC number of a cell outputted from the FIFO 2 by the connection identification unit 281. Then, the first VC number extractor unit 12 generates and outputs a signal h for instructing the cell number counter 11 corresponding to the VC number to count down.

Therefore, the second VC number extractor unit 13 detects the VC number of a cell inputted to the FIFO 2 and registers an active connection with the VC number in the active VC storage unit 9, simultaneously counts up a cell number counter 11 corresponding to the active connection with the VC number and counts the number of cells of the active connection inputted to the FIFO 2. On the other hand, the first VC number extractor unit 12 detects a cell outputted from the FIFO 2, obtains the VC number of the cell, and decrements the counter value of a cell number counter corresponding to the connection with the VC number. Thus, the counter value of the cell number counter 11 indicates the number of cells currently stored in the FIFO 2 of a connection corresponding to the cell number counter 11.

Since when a connection is active, cells are transmitted at intervals less than a predetermined period, the number of cells stored in the FIFO 2 never becomes "0". Therefore, by counting the number of cells stored in the FIFO 2 for each connection, whether each of the connections is active or nonactive, can be judged.

The rate measurement unit 1 obtains the VC number of an inputted cell, refers to the virtual MCR value of an active connection with the VC number in the virtual MCR storage unit 7, and by the process described above outputs rate-over information a' to the input control unit 4. When receiving the rate-over information a' from the rate measurement unit 1 and congestion monitoring information b from the queue length monitor unit 3, the input control unit 4 judges whether to discard the cell inputted to the rate measurement unit 1 or to input it to the FIFO 2. The re-calculator circuit 6 refers to the active VC storage unit 9 and judges which connections are active. Then, the re-calculator circuit 6 reads the MCR value of an active connection from the MCR storage unit 5, re-calculates the virtual MCR values of the active connection, and stores the virtual MCR value in the virtual MCR storage unit 7.

Figure 7:
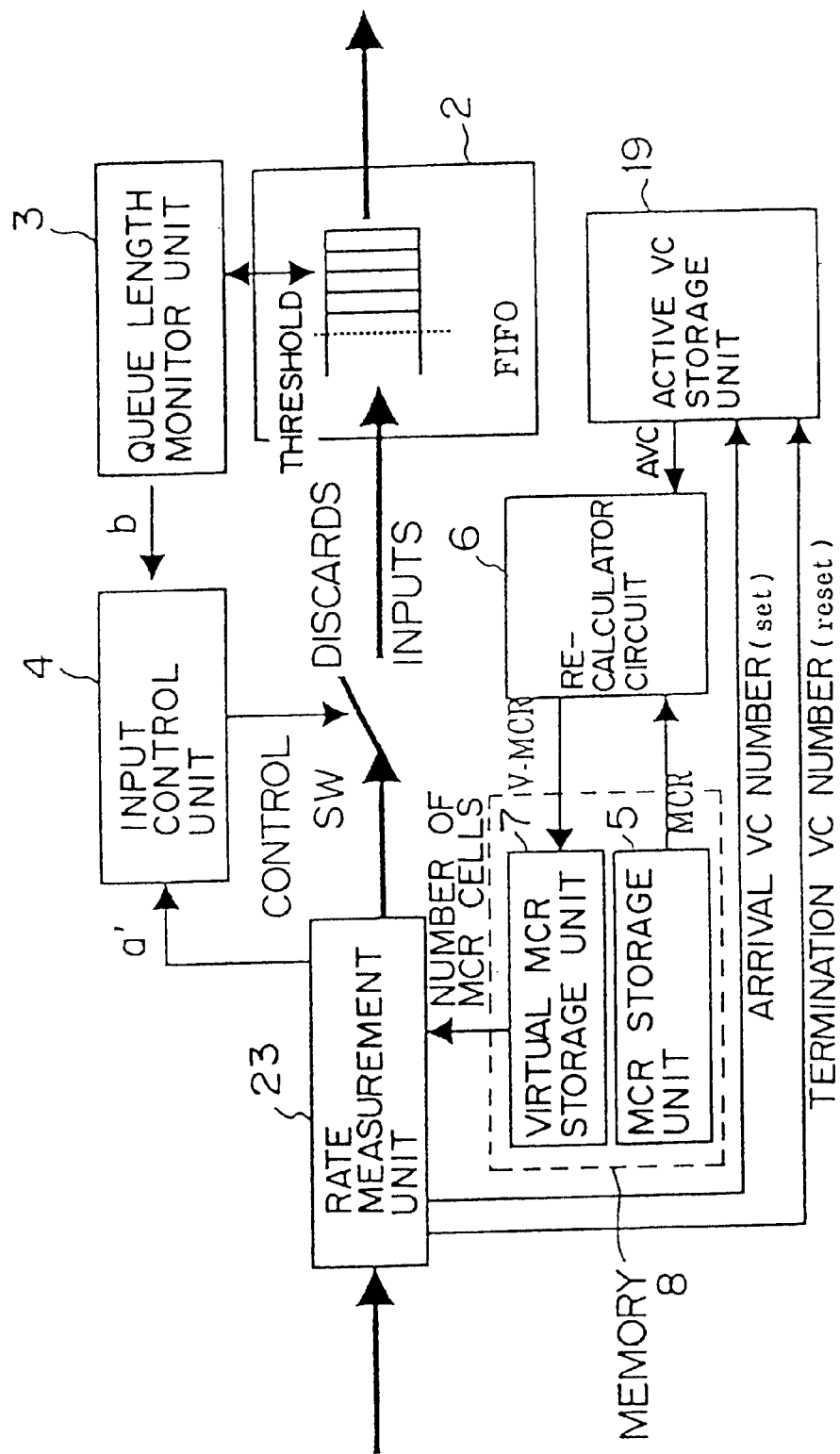
FIG. 7 shows the configuration of the fifth preferred embodiment of the present invention.

FIG. 7 shows the configuration of a rate band managing apparatus being the fifth preferred embodiment of the present invention.

In FIG. 7, the same reference numerals are attached to the same components as those shown in FIG. 4.

This preferred embodiment adopts a method of detecting the tail of a packet for the detection of non-active connections. As shown in FIG. 7, every time a new cell is inputted, a rate measurement unit 23 reports an "arrival VC number" to an active VC storage unit 19 (arrival VC notice). However, when receiving a cell composing the tail of a packet, the rate measurement unit 23 does not issue an arrival VC notice, but reports a termination VC number (termination VC notice). The active VC storage unit 19 sets a connection with the VC number reported when receiving the "arrival VC" notice and resets from active to non-active a connection with the VC number reported when receiving the "termination VC" notice.

That is, when receiving a cell, the rate measurement unit 23 obtains the VC number of the cell and reports the VC number to the active VC storage unit 19. If the cell is the first cell from the connection with the VC number, the fact that the connection is active is not registered in the active VC storage unit 19 yet. When receiving the arrival VC number from the rate measurement unit 21, the active VC storage unit 19 registers the new reported VC number or by referring to a list prepared in advance in order to register an effective bit for each connection, sets an effective bit corresponding to a corresponding connection with the reported VC number of the list to, for example, "1" (effective). When receiving a cell indicating the termination of a communication for a certain connection, the rate measurement unit 23 obtains a VC number from the cell and reports the VC number to the active VC storage unit 19 as a termination VC number (reports a termination VC number). When receiving the termination VC number, the active VC storage unit 19 deletes the registration of the termination VC number or sets an effective bit corresponding to the termination VC number to "0" (ineffective).

In this way, the active VC storage unit 19 in which information on active connections is continually updated, is referred to by the re-calculator circuit 6. The re-calculator circuit 6 obtains the MCR value of each active connection from the MCR storage unit 5 according to the information on active connections obtained from the active VC storage unit 19, calculates a virtual MCR value for each of the active connections, and stores the virtual MCR value in the virtual MCR storage unit 7. The rate measurement unit 23 refers to the virtual MCR value for each of the connections in the virtual MCR storage unit 7, and outputs to the input control unit 4 rate-over information a' indicating that the received cell is a cell transmitted at a rate exceeding the virtual MCR value. When receiving the rate-over information a' and congestion monitoring information b from the rate measurement unit 21 and the queue length monitor unit 3, respectively, according to both information a' and b the input control unit 4, discards the cell inputted to the rate measurement unit 23 or inputs it to the FIFO 2 by turning on/off the switch SW.

FIG. 8 explains the data structure of each protocol layer in a so-called "IP over ATM" which performs IP communications on an ATM network.

A TCP datagram 101 generated in the protocol of a higher-order layer comprises control information 101a indicated by hashed lines in FIG. 8 and data 101b to be transmitted. In an IP protocol, an IP packet 103 is generated with a header 103a including an address, etc. attached to this TCP datagram 101. The IP packet is incorporated into an AAL 5 frame 105 with a trailer 105b including a "CRC (error detection)" and a "PAD" for performing a padding for adjusting a data length in such a way as to make the length of data a multiple of 48 bytes, etc. at the tail of the AAL 5 of an ATM adaptation layer being a lower-order layer. Then, the AAL 5 frame 105 is split into ATM cells 107 (107-1 and 107-2) with a fixed length of 53 bytes. The ATM cell 107 comprises a header 107a of 5 bytes and a payload 107b of 48 bytes. The AAL 5 frame 105 is split in units of 48 bytes and stored in the payload 107b of the ATM cell 107. Since generally speaking, the TCP datagram 101, IP packet 103 and AAL 5 frame 105 are all variable in length and longer than the ATM cell 107, they are split into a plurality of ATM cells and are stored. In the header 107a of the ATM cell 107, information called payload type identifier (PTI) is included. When the payload 107b of the ATM cell 107 includes the tail of a split AAL 5 frame, the PTI is set to "001" (without network congestion) or "011" (with network congestion). When the payload 107b of the ATM cell 107 includes a part other than the tail of the split AAL 5 frame, the PTI is set to "000" (without network congestion) or "010" (with network congestion).

Therefore, the detection of the termination VC number shown in FIG. 7 is available by referring to the set value of the PTI of the ATM cell.

Figure 9:
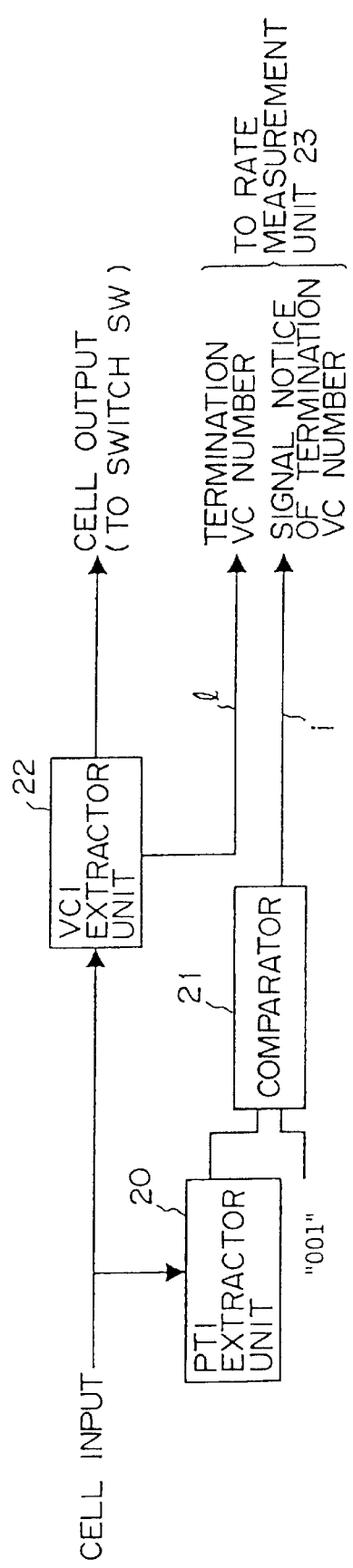
FIG. 9 shows the configuration of the rate measurement unit of a fifth preferred embodiment to detect the tail of a packet.

FIG. 9 shows a configuration of a circuit for detecting the tail of a packet provided in the rate measurement unit 23 of the fifth preferred embodiment described above.

The configuration shown in FIG. 9 comprises a PTI extractor unit 20 for extracting a PTI (3 bits) from the header of an inputted cell (ATM cell) and a virtual channel identifier (VCI, the same as VC number) extractor unit 22 for extracting a VCI. PTIs extracted by the PTI extractor unit 20 are transmitted to a comparator 21 and are compared with both values of "001" and "011". If the PTI value is "001" or "011", the comparator 21 judges that the inputted cell is the tail cell of the AAL 5 frame 105 and transmits a signal i for reporting to the active VC storage unit 19 that the VC number outputted to the active VC storage unit 19 by the VCI extractor unit 22 is a termination VC number 1.

Figure 10:
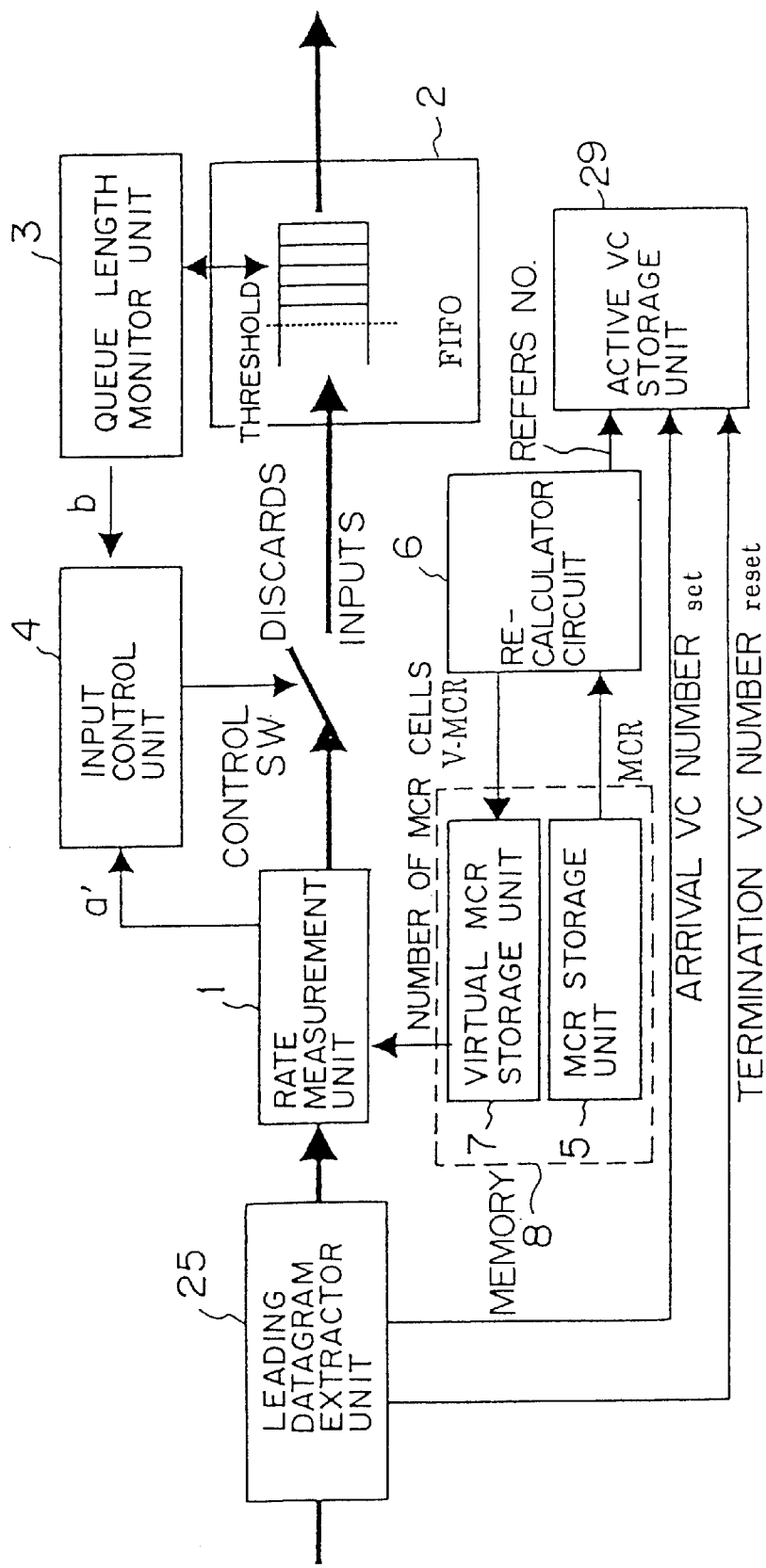
FIG. 10 shows the configuration of the sixth preferred embodiment of the present invention.

FIG. 10 shows the configuration of a rate band managing apparatus being the sixth preferred embodiment of the present invention.

In FIG. 10, the same reference numerals are attached to the same components as those shown in FIG. 5.

This preferred embodiment is used when a TCP datagram is transmitted in an ATM network. The TCP protocol sets in the header a flag called a SYN bit and a flag called a FIN bit when setting up and releasing a connection, respectively, and sets up or releases a connection. As shown in FIG. 8, although encapsulated in an IP packet 103 and further in an AAL 5 frame 105, the TCP datagram is stored in the payload 107b of an ATM cell 107, and a TCP header is always included in the payload 107b of the leading ATM cell 107.

As shown in FIG. 10, this preferred embodiment is provided with a leading datagram extractor unit 25, and both the SYN bit and FIN bit of the TCP header are checked each time. When receiving a SYN bit and a FIN bit, the leading datagram extractor unit 25 issues to an active VC storage unit 29 an arrival VC number notice and a termination VC number notice, respectively. Since the completion of the transmission of a series of TCP datagrams can be learned by a cell storing a TCP header with a set FIN bit, by detecting a cell storing a TCP header with a set SYN bit, a leading TCP datagrams of a next series of TCP datagram to be transmitted can be extracted.

When receiving an arrival VC number from the leading datagram extractor unit 25, the active VC storage unit 29 registers the VC number or sets an effective bit corresponding to the VC number. When the leading datagram extractor unit 25 detects the completion of the transmission of a TCP datagram, a termination VC number is reported from the leading datagram extractor unit 25 to the active VC storage unit 29, and the active VC storage unit 29 deletes an active connection with the VC number or sets an effective bit corresponding to the VC number to "0".

In this way, the active VC storage unit 29 in which information on active connections is continually updated, is referred to by the re-calculator circuit 6. The re-calculator circuit 6 obtains the MCR value of an active connection from the MCR storage unit 5, calculates the virtual MCR value, and stores the virtual MCR value in the virtual MCR storage unit 7. The rate measurement unit 1 obtains the virtual MCR value of each connection from the virtual MCR storage unit 7, generates rate-over information a' for each of the connections, and outputs the rate-over information a' to the input control unit 4. Congestion monitoring information b is also outputted from the queue length monitor unit 3 to the input control unit 4. According to both the rate-over information a' and the congestion monitoring information b the input control unit 4 determines whether to discard a cell inputted to the rate measurement unit 1 or to input it to the FIFO 2 by turning on/off the switch SW.

Figure 11:
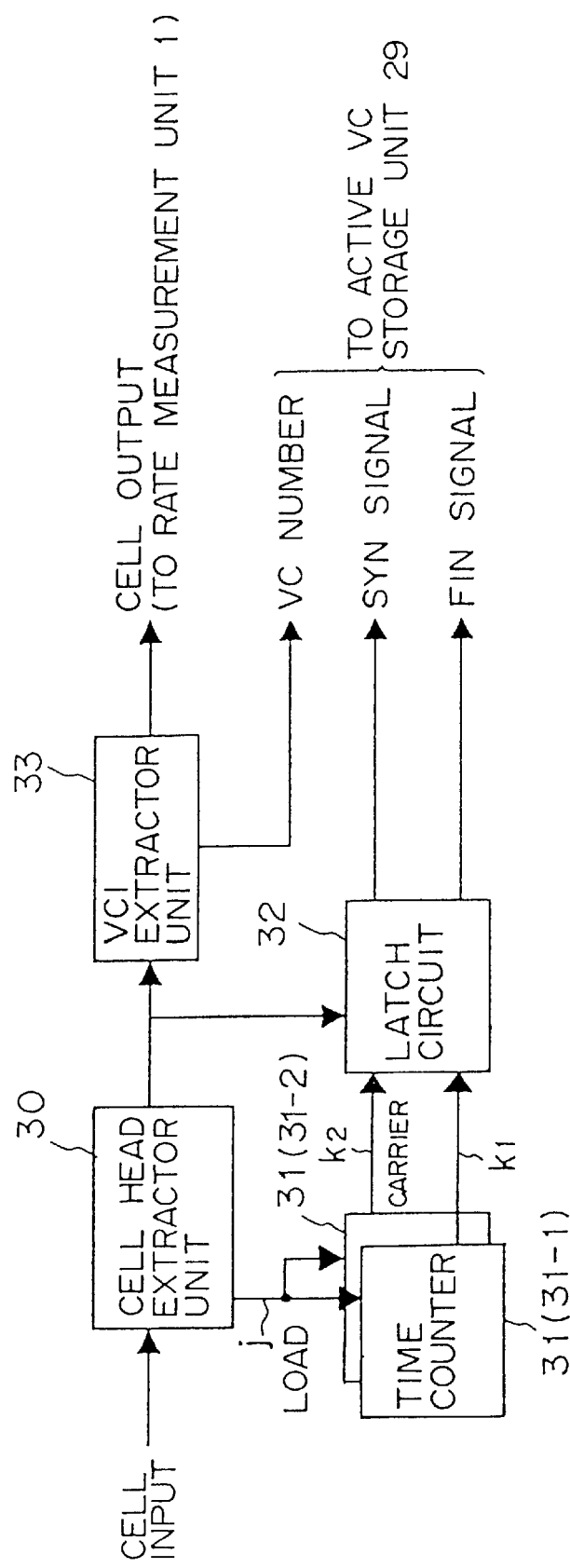
FIG. 11 shows the configuration of the leading datagram extractor unit of a sixth preferred embodiment to detect both SYN and FIN bits.

FIG. 11 shows a configuration of circuits for detecting each of the SYN and FIN bits provided in the leading datagram extractor unit 25 of a sixth preferred embodiment.

In the configuration shown in FIG. 11, first, when extracting the head of a cell, a cell head extractor unit 30 outputs a load signal j to two time counters 31 (31-1 and 31-2) and simultaneously outputs the data of the cell to both a VCI extractor unit 33 and a latch circuit 32. Then, using carrier signals k1 and k2 outputted from the time counters 31-1 and 31-2, respectively, to the latch circuit 32, the cell head extractor unit 30 makes the latch circuit 32 latch the predetermined bits of the cell a predetermined time slot later after the head extraction, corresponding to the SYN and FIN bits of a TCP header, respectively. When latching the SYN bit of "1", the latch circuit 32 outputs the SYN signal of "1" to the active VC storage unit 29. Since at this time a VC number extracted from the cell by the VCI extractor unit 33 is outputted to the rate measurement unit 29, the VC number of a connection to be made active by the SYN signal of "1" is reported to the rate measurement unit 1. On the other hand, when latching the FIN bit of "1", the latch circuit 32 outputs the FIN signal of "1" to the active VC storage unit 29. Since at this time a VC number extracted from the cell by the VCI extractor unit 33 is outputted to the rate measurement unit 29, the VC number of a connection to be made nonactive for the active VC storage unit 29 by the FIN signal of "1" is reported to the active VC storage unit 29. The VCI extractor unit 33 has the functions similar to those of the VCI extractor unit 22 shown in FIG. 9.

In the above configuration, when receiving a cell, the cell head extractor unit 30 detects the head of the cell, outputs a load signal j to the time counters 31-1 and 31-2, and makes the time counters 31-1 and 31-2 start counting time slots. The cell head extractor unit 30 outputs the bit data of the inputted cell to both the VCI extractor unit 33 and the latch circuit 32 in order. When being loaded with predetermined first and second counter values by the input of the above load signal j, the time counters 31-1 and 31-2, respectively, count down or up synchronized with a clock signal not shown in FIG. 11 and counts time slots. When it comes to a time slot in which the SYN and FIN bits are inputted, the time counters 31-1 and 31-2 output to the latch circuit 33 carrier signals k1 and k2, respectively, to make the latch circuit 32 latch the bit of the time slot. The latch circuit 32 latches the SYN bit or FIN bit inputted from the cell head extractor unit 30 according to the input of the carrier signals k1 and k2. The latch circuit 32 outputs the statuses of the latched SYN and FIN bits to the active VC storage unit 29 as a SYN signal and a FIN signal, respectively. The VCI extractor unit 33 extracts the VCI of a cell inputted from the cell head extractor unit 30 and outputs the VCI to the active VC storage unit 29 as a VC number, and simultaneously outputs the whole cell to the rate measurement unit 1.

Figure 12:
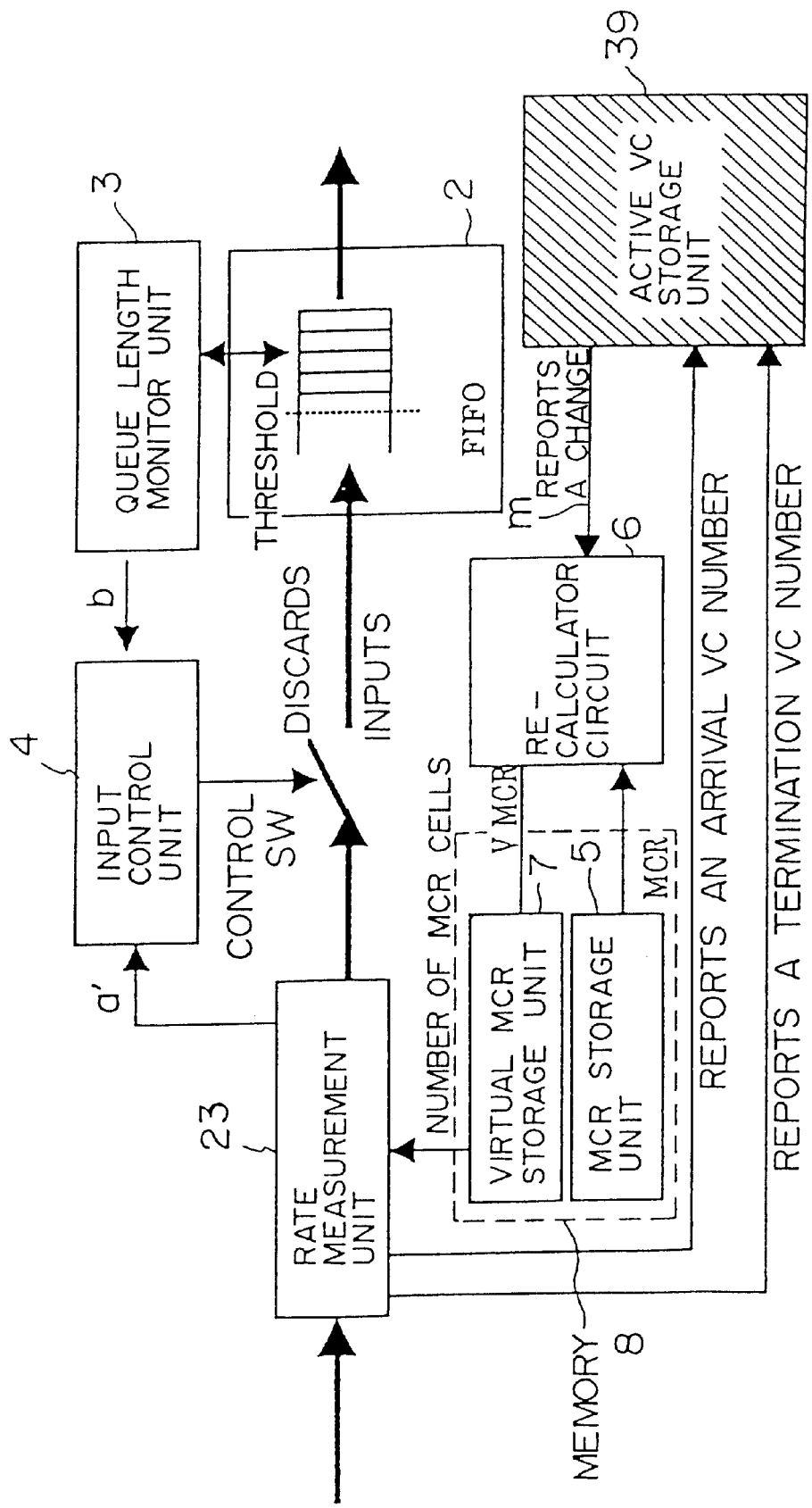
FIG. 12 shows the configuration of the seventh preferred embodiment of the present invention.

FIG. 12 shows the configuration of a rate band managing apparatus being the seventh preferred embodiment of the present invention.

In FIG. 12, the same reference numerals are attached to the same components as those shown in FIG. 4.

Although in the second to sixth preferred embodiments the re-calculator circuit 6 refers to the active VC storage unit at an arbitrary timing, it is sufficient to re-calculate an MCR only when there is a change in the registered contents of the active VC storage unit. Such being the case, in the preferred embodiment of FIG. 12, a change notice m is transmitted from an active VC storage unit 39 to the re-calculator circuit 6, and the re-calculator circuit 6 re-calculates a virtual MCR value with this input as a trigger.

That is, in the same way as the preferred embodiment shown in FIG. 7, when receiving a cell, the rate measurement unit 23 reports an arrival VC number to the active VC storage unit 39. The active VC storage unit 39 judges whether or not the reported VC number is already registered. If the VC number is not registered yet, it registers the VC number and simultaneously reports the reported VC number to the re-calculator circuit 6 by a change notice m. The re-calculator circuit 6 receives this change notice m from the active VC storage unit 39 and re-calculates the virtual MCR value of each active connection.

In the same way as the preferred embodiment shown in FIG. 7, the rate measurement unit 23 reports a termination VC number to the active VC storage unit 39. The active VC storage unit 39 deletes the reported VC number from a registration list, and simultaneously reports the VC number to the re-calculator circuit 6 by a change notice m.

When receiving the change notice m, the re-calculator circuit 6 re-recognizes currently active connections, obtains the MCR values of these currently active connections from the MCR storage unit 5, calculates the virtual MCR value for each of the active connections, and stores the calculation results in the virtual MCR storage unit 7. The rate measurement unit 23 obtains updated virtual MCR values from the virtual MCR storage unit 7, monitors the input cell rate for each connection, and reports rate-over information a' to the input control unit 4. According to both congestion monitoring information b from the queue length monitor unit 3 and the rate-over information a', the input control unit 4 discards the cell inputted to the rate measurement unit 23 or inputs it to the FIFO 2 by turning on/off the switch SW.

Although FIG. 12 seems to show that one switch SW controls the discarding of the cell inputted to the rate measurement unit 23 and the input of the cell to the FIFO 2, this is one example. Therefore, for example, when a different FIFO is provided for each service class with a different rate band, a different switch is provided corresponding to each FIFO.

Figure 13:
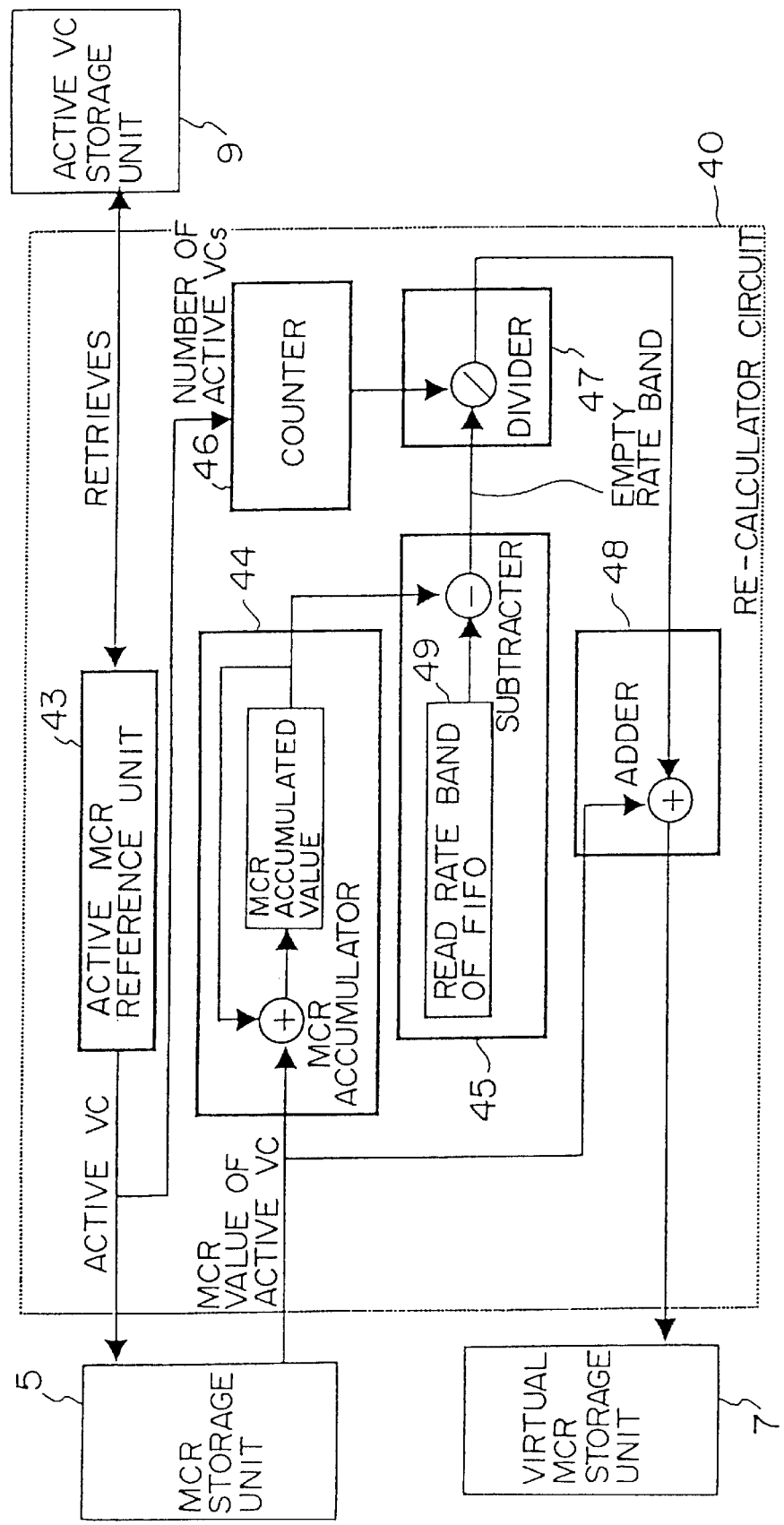
FIG. 13 shows a first configuration of a re-calculator circuit.

FIG. 13 shows a first configuration of the re-calculator circuit described above.

FIG. 13 shows the configuration of a re-calculator circuit 40 for evenly distributing the available rate band of the FIFO among active connections. First, an active MCR reference unit 43 retrieves active connections from an active VC storage unit 9, reads the MCR value from the MCR storage unit 5, and outputs the MCR value to an MCR accumulator 44. The MCR accumulator 44 accumulates the MCR values of all active connections inputted from the MCR storage unit 5. A subtracter 45 calculates an available rate band by subtracting the sum of the MCR values of all the active connections inputted from the accumulator 44 from the read rate band of the FIFO 2. A counter 46 counts the number of active connections (sum of active connections) inputted from the active MCR reference unit 43. A divider 47 calculates the evenly distributed value of the available rate band allocated to each active connection by dividing an available rate band inputted from the subtracter 45 by the total number of the active connections inputted from the counter 46. An adder 48 calculates the virtual MCR value of each of the active connections by adding the value inputted from the divider 47 and the MCR value of each active connection inputted from the MCR storage unit 5. This virtual MCR value is outputted from the adder 48 to the virtual MCR storage unit 7 and is stored in the virtual MCR storage unit 7. The first virtual MCR value of each connection obtained by the above re-calculator circuit 40 is expressed as follows.

$$V\text{-}MCRi = MCRi + (B - \text{sum of } MCRi)/N \tag{1}$$

N: Number of active connections
B: Read rate band of FIFO 2
V-MCRi: Virtual MCR value of active connection i
MCRi: MCR value of active connection i
sum of MCRi: Sum of MCR values of all active connections FIG. 14 shows a second configuration of the re-calculator circuit described above.

Figure 14:
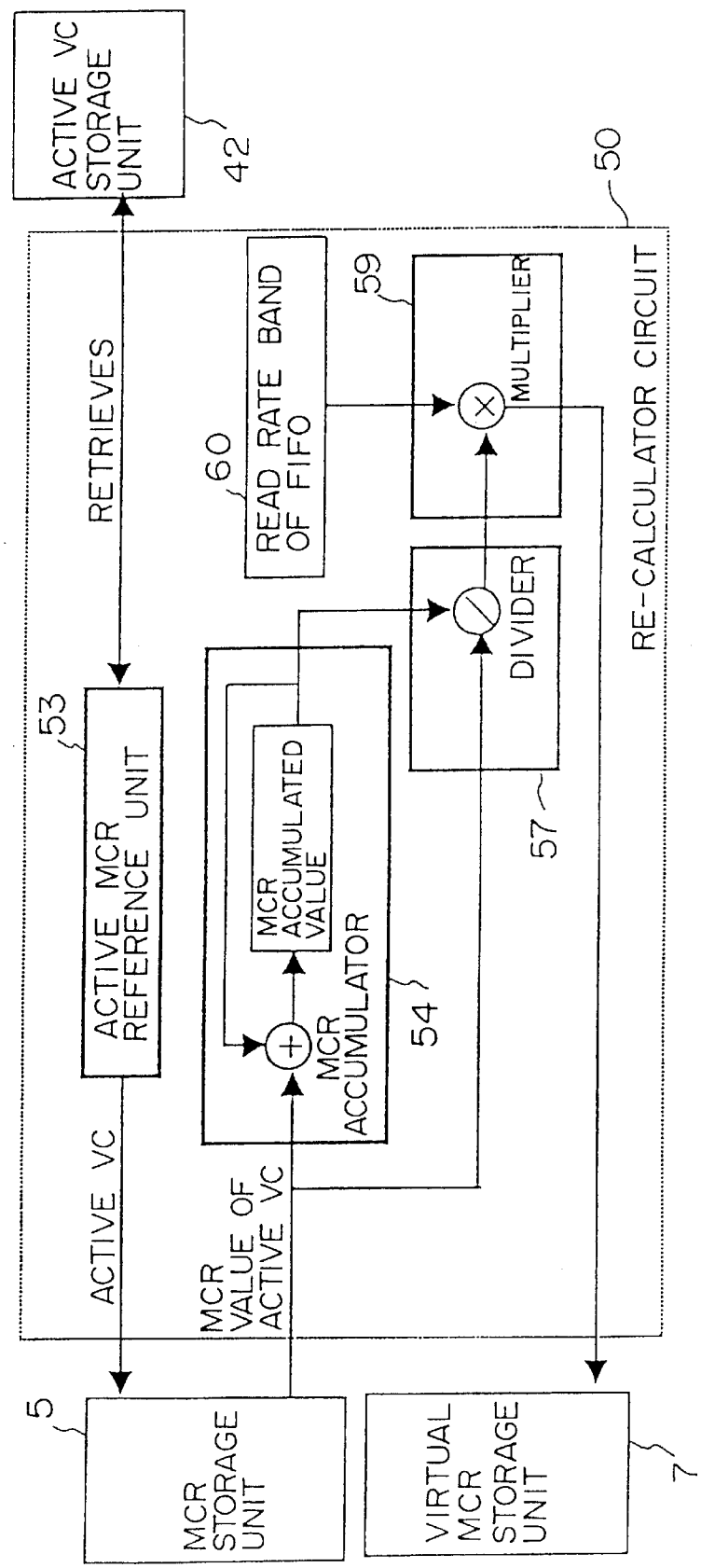
FIG. 14 shows a second configuration of a re-calculator circuit.

FIG. 14 shows the configuration of a re-calculator circuit 50 for distributing the available rate band of the FIFO 2 to each connection in proportion to the MCR. First, the active MCR reference unit 53 retrieves active connection information from the active VC storage unit 42, and reads the MCR value of each active connection from the MCR storage unit 5. The read MCR value of each active connection is inputted to both the MCR accumulator 54 and the divider 57. The MCR accumulator 54 calculates the sum of the MCR value of all the active connections. The divider 57 divides the virtual MCR value of each active connection inputted from the virtual MCR storage unit 7 by the sum of the MCR values inputted from the MCR accumulator 54. A multiplier 59 calculates the virtual MCR value of each active connection by multiplying the divided value of each active connection inputted from the divider 57 by the read rate band 60 of the FIFO 2. The virtual MCR value of each active connection calculated in this way is outputted from the re-calculator circuit 50 to the virtual MCR storage unit 7 and is stored there. The virtual MCR value of each active connection calculated by the above re-calculator circuit 50 is expressed as follows.

$$V\text{-}MCRi = B \times (MCRi / \text{sum of } MCRi) \tag{2}$$

The parameters represented by each of the symbols of expression (2) are the same as those of expression (1).

Figure 15:
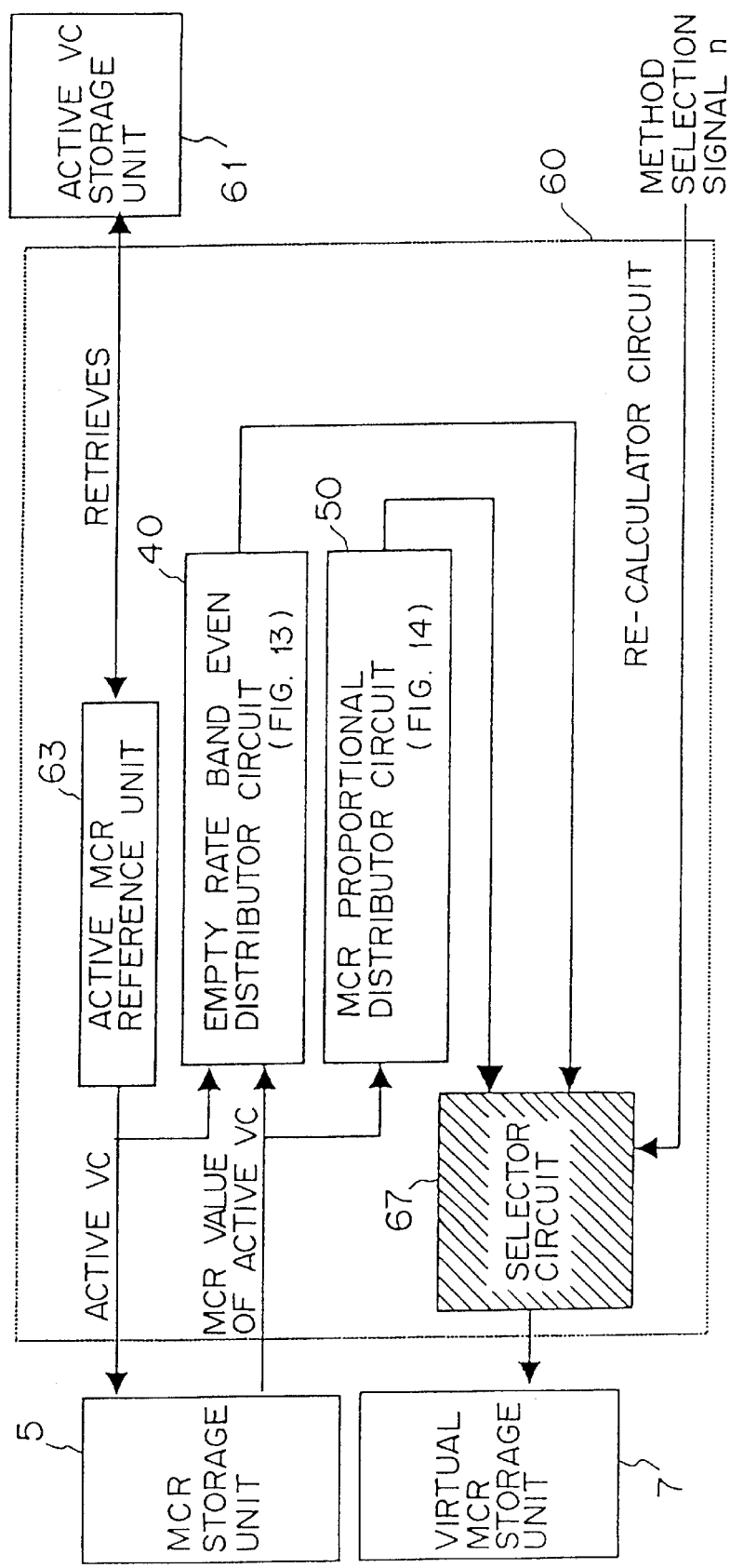
FIG. 15 shows a third configuration of a re-calculator circuit.

FIG. 15 shows a third configuration of the re-calculator circuit described above.

Although in FIGS. 13 and 14 two virtual MCR calculation methods for the re-calculator circuit 6 are shown, which of the two methods should be used is determined from the viewpoint about how impartially an available rate band is to be distributed among connections. Therefore, the re-calculator circuit can also be designed to be used for both of the two methods, and either of the two methods can be selected by an operator's designation.

A re-calculator circuit 60 shown in FIG. 15 is provided with both the available rate band even distribution circuit (a first re-calculator circuit) 40 shown in FIG. 13 and the MCR proportional distribution circuit (second re-calculator circuit) 50 shown in FIG. 14, and by providing a virtual MCR selector circuit 67, the two V-MCRi calculation methods can be switched over by way of software control.

An active MCR reference unit 63 accesses an active VC storage unit 61 and detects the VC numbers (active VCs) of active connections. The active MCR reference unit 63 reads the MCR value of an active connection with the VC number from the MCR storage unit 5, and inputs the MCR value to both the available rate band even distribution circuit 40 and the MCR proportional distribution circuit 50. The VC number of the active connection is also inputted from the active MCR reference unit 63 to the available rate band even distribution circuit 40, and is used by the available rate band even distribution circuit 40 to count the total number of the active connections. The first and second virtual MCR values of each active connection calculated by both the available rate band even distribution circuit 40 and the MCR proportional distribution circuit 50 are both inputted to the selector circuit 67. The selector circuit 67 outputs to the virtual MCR storage unit 7 the virtual MCR value inputted by either the available rate band even distribution circuit 40 or the MCR proportional distribution circuit 50 according to a method selection signal n inputted by an operator. In this way, the virtual MCR value of each active connection calculated by the method designated by the operator is stored in the virtual MCR storage unit 7.

When the selector circuit 67 is switched over while the system is operating, there will be a possibility that virtual MCR values calculated by different methods are mixed in the virtual MCR storage unit 7, and an available rate band cannot be appropriately distributed. In some cases, the operation of the rate measurement unit 1 is affected, the FIFO 2 overflows, and cells which should not be discarded are discarded. Therefore, it is desirable to switch over the selector circuit 67 when the system is started, after the system is stopped for the time being or before the operation is restarted after stopping.

Figure 16:
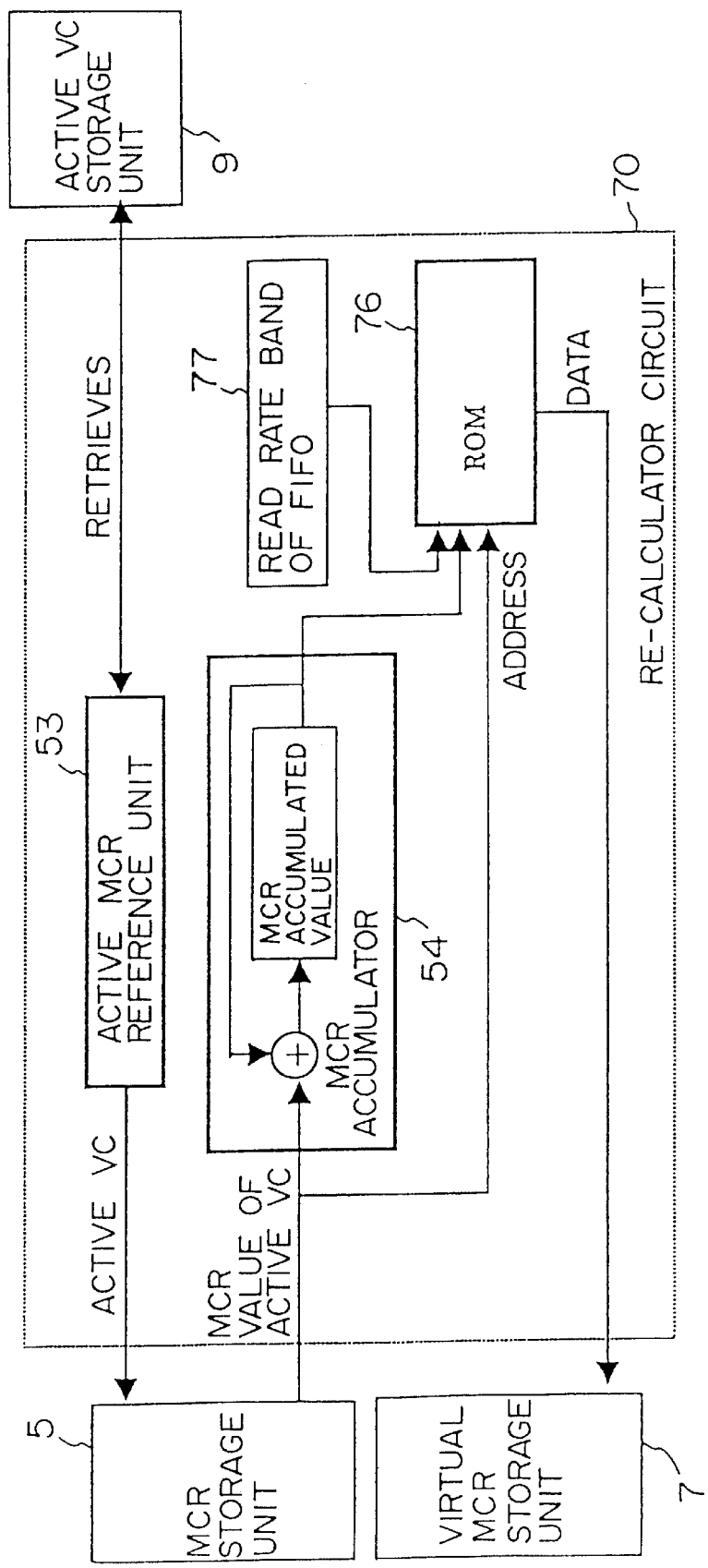
FIG. 16 shows a fourth configuration of a re-calculator circuit.

FIG. 16 shows a fourth configuration of the re-calculator circuit described above.

Although in the re-calculator circuits 40 and 50 shown in FIGS. 13 and 14, a multiplier, a divider, etc. are used, a virtual MCR value can also be calculated at high speed by reading a predetermined virtual MCR value stored in a ROM, etc. using the VC number, etc. of an active connection (active VC), if the number of connections is small or if an MCR value to be obtained is limited. FIG. 16 shows a configuration of a re-calculator circuit 70 in which the functions of the divider 57 and multiplier 59 are replaced with a ROM 76 by partly modifying the re-calculator circuit 50 shown in FIG. 14.

The active MCR reference unit 53 accesses an active VC storage unit 71 and obtains the VC numbers of all active connections. Then, the active MCR reference unit 53 transmits the VC numbers to the MCR storage unit 5 and reads the MCR values of all the active connections from the MCR storage unit 5. The MCR values of all the active connections read from the MCR storage unit 5 are inputted to an MCR accumulator 54, the MCR values of all the active connections are accumulated (summed) by the MCR accumulator 54, and the sum is inputted to a ROM 76 as a part of an address signal to read the stored data. The MCR value of each active connection is also inputted to the ROM 76 as a part of the address signal. Furthermore, the read rate band 77 of the FIFO 2 is also inputted to the ROM 76 as a part of the address signal. In an address indicated by the address signal from the ROM 76 the virtual MCR value is stored, and the virtual MCR value of each active connection can be immediately read from the ROM 76. The virtual MCR value of each active connection read from the ROM 76 is inputted to and stored in the virtual MCR storage unit 7.

Figure 17:
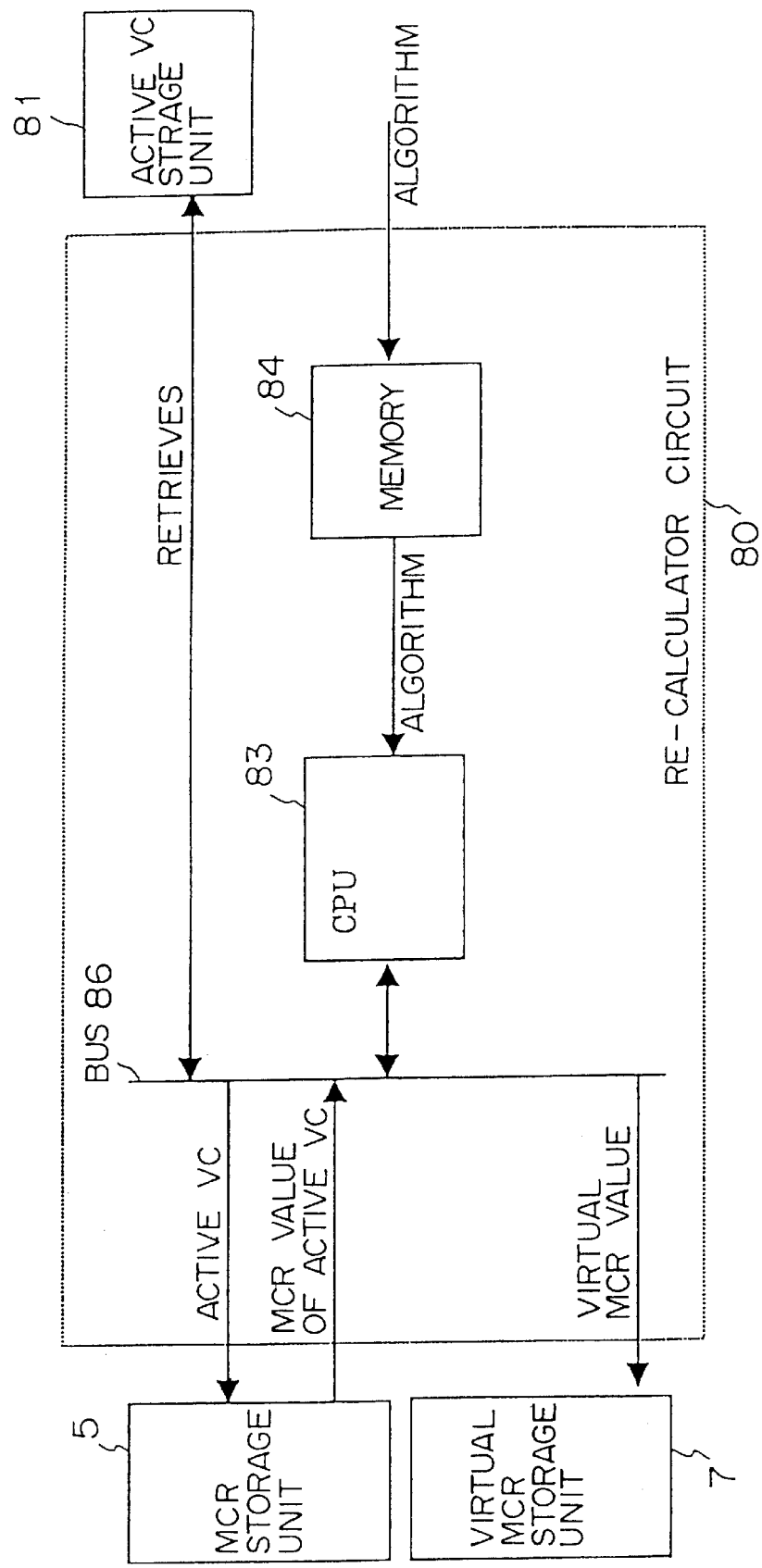
FIG. 17 shows a fifth configuration of a re-calculator circuit.

FIG. 17 shows a fifth configuration of the re-calculator circuit.

In each of the re-calculator circuits described above, the re-calculation of the virtual MCR values of active connections are made by way of hardware. However, for a method of impartially distributing an available rate band among active connections, a variety of methods can be considered, and both the use of a central processing unit (CPU) and the software-processing of the above calculation using a variety of algorithms is effective to implement a flexible circuit. In FIG. 17, a CPU 83 is provided and the virtual MCR value of each active connection is re-calculated according to an algorithm stored in a memory 84.

First, an operator instructs the memory 84 to store a program to do the above re-calculation according to a predetermined algorithm through a predetermined input device. If the memory 84 is a ROM chip, the program can also be written in the production process. Since the CPU 83 does the calculation of the virtual MCR value of each active connection according to the program stored in the memory 84, any calculation method is available by properly re-writing or modifying the kind of a program to be stored in the memory 84. Even if a method of distributing the available rate band of the FIFO 2 among active connections changes in the future, the re-calculator circuit 80 of this configuration can flexibly correspond to such a change immediately.

The CPU 83 retrieves the VC number of an active connection from an active VC storage unit 81 through a bus 86. Then, the CPU 83 outputs the read VC number of the active connection to the MCR storage 5 through the bus 86, and reads the MCR values of all the active connections from the MCR storage unit 5. Then, the CPU 83 calculates the virtual MCR value of each active connection from the MCR values of all the active connections read from the MCR storage unit 5 and the read rate band of the FIFO 2, etc. read from the memory 84, and stores the virtual MCR value in the virtual MCR storage unit 7 through the bus 86.

Figure 18:
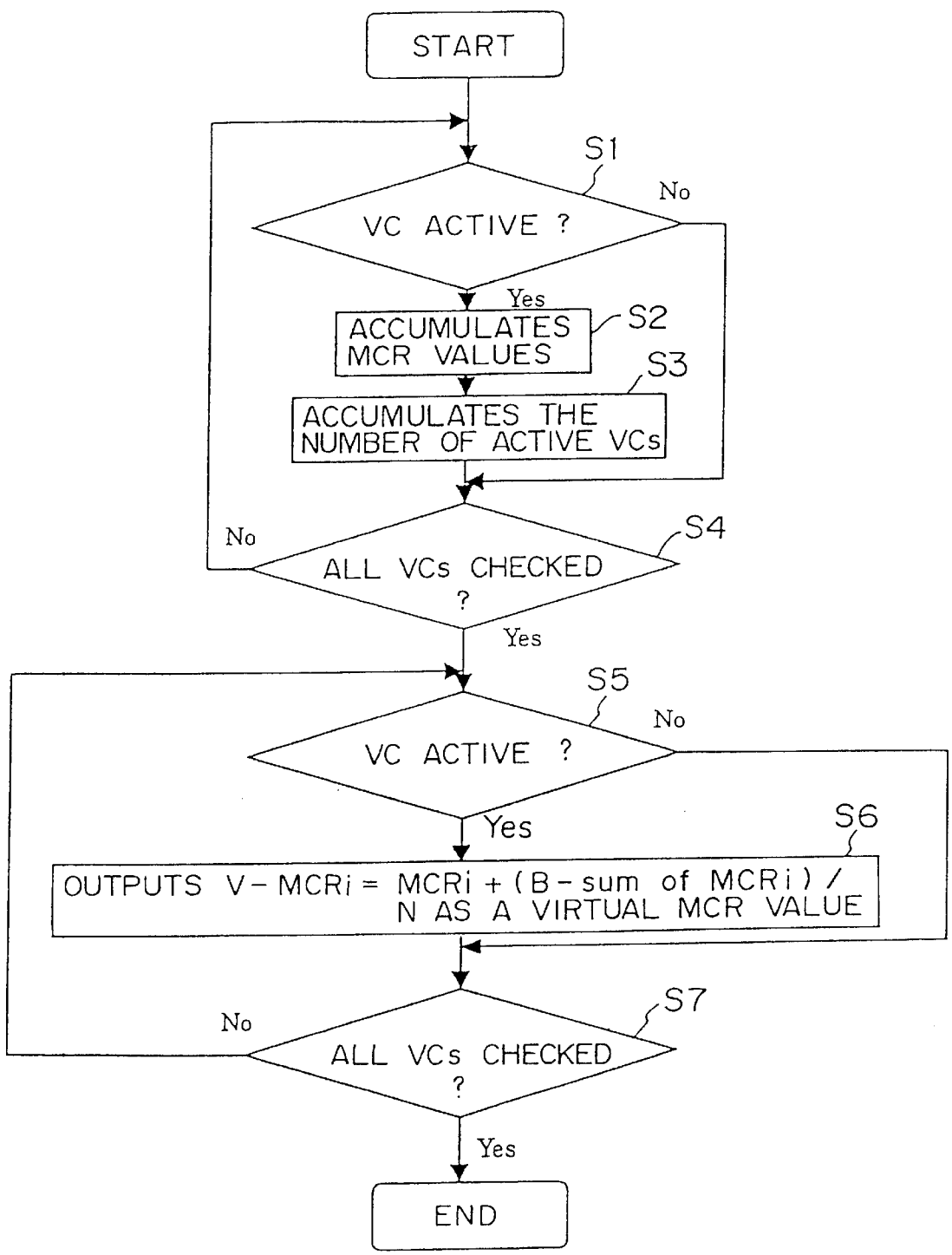
FIG. 18 is a flowchart showing the process of a CPU calculating a virtual MCR value by evenly distributing an available rate band.

FIG. 18 is a flowchart explaining a process of a CPU 83 shown in FIG. 17 calculating the virtual MCR value of each active connection using a method of evenly distributing an available rate band.

First, in step S1, the CPU 83 retrieves the active connection information from the active VC storage unit 81 and judges whether or not the connection of a certain VC value (VC number) is active. If the connection is not active, the flow proceeds to step S4. If the connection is active, in step S2, the CPU 83 reads the MCR value of the active connection from the MCR storage unit 5, and accumulates the MCR values to obtain the sum of the MCR values of all the active connections. In step S3, the CPU 83 accumulates the number of connections judged to be active in step S1 to obtain the total number of all the active connections. In step S4, the CPU 83 judges whether or not the judgement of all VC values, that is, the active/non-active judgement of step S1 for all connections is completed. If the process is not completed for all the connections, the flow returns to step S1, and executes the judgement process of whether or not the connection of a next VC value is active. When in step S4, it is judged that the process of step S1 is completed for all the connections, the flow proceeds to step S5.

In step S5, the CPU 83 accesses the active VC storage unit 81 again, and judges whether or not a connection with a certain VC value is active. If the connection is not active, the flow proceeds to step S7, since the connection is not a target whose virtual MCR value is to be calculated. If the connection is active, the flow proceeds to step S6. In step S6, the CPU 83 performs the calculation of the expression (1) described above using values obtained in steps S2 and S3, calculates the virtual MCR value of this connection, and outputs the virtual MCR value to the virtual MCR storage unit 7 and stores it there. Then, in step S7, it is judged whether or not the process of step S5 is executed for all VC values, that is, all connections. If the process is not executed for all connections, the flow returns to step S5 and the above process is repeated for a next VC value, that is, a next connection. When the above process is completed for all connections, the calculation/output process of the virtual MCR values of all active connections is terminated.

Figure 19:
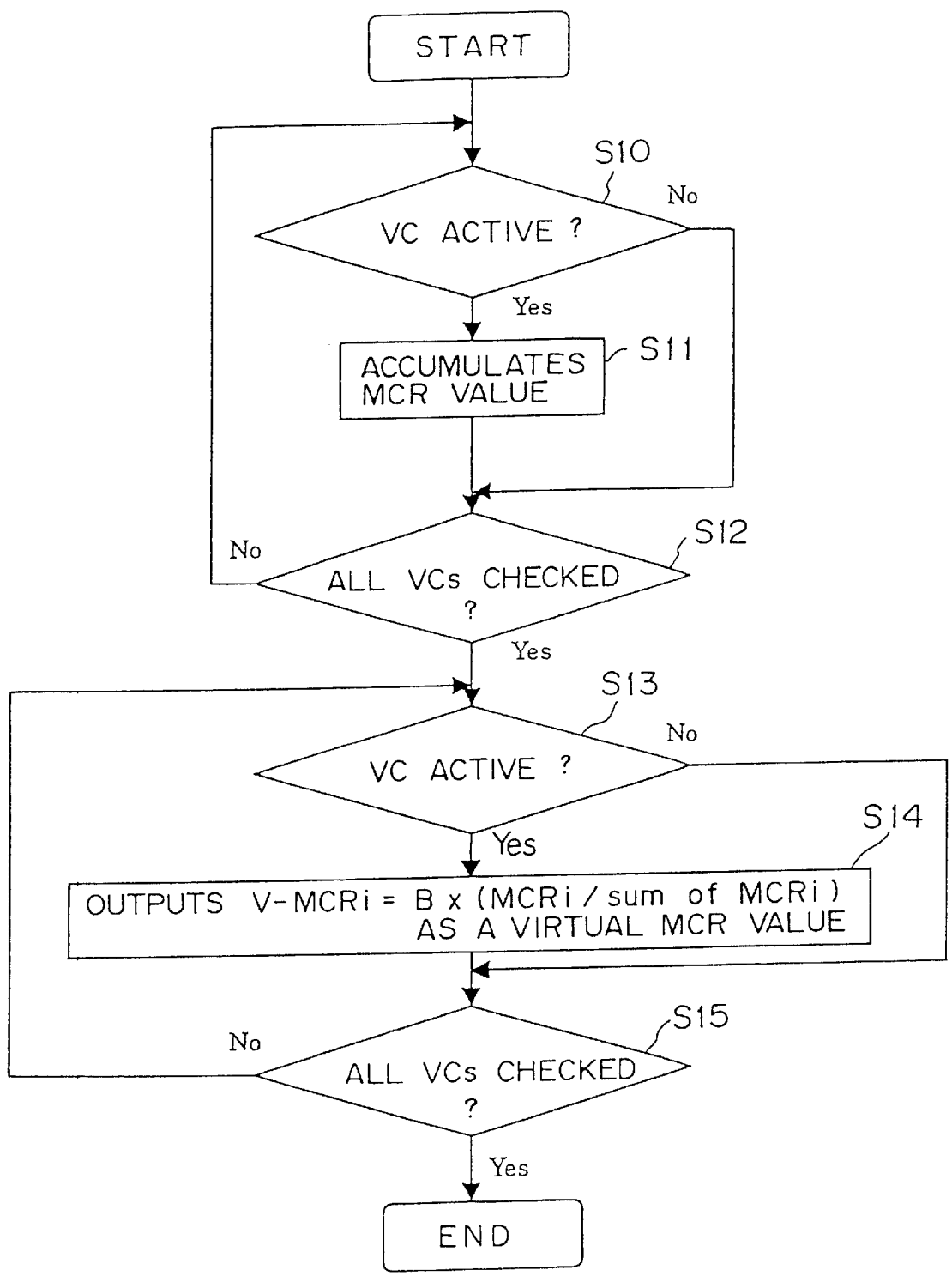
FIG. 19 is a flowchart showing the process of a CPU calculating a virtual MCR value by distributing an available rate band in proportion to the MRC value of each active connection.

FIG. 19 is a flowchart showing the process of the CPU 83 shown in FIG. 17 calculating the virtual MCR value of each active connection by distributing the available rate band of the FIFO 2 in proportion to the MCR value of each active connection.

First, in step S10, the CPU 83 refers to the active VC storage unit 81 regarding the connection of a certain VC value, and judges whether or not the connection is active. If the connection is not active, the flow proceeds to step S12. If the connection is active, in step S11 the CPU 83 obtains the MCR values from the MCR storage unit 5, and accumulates the MCR values to calculate the sum of the MCR values of all active connections. In step S12, it is judged whether or not the process of step S10 is executed for all connections (all VC values). If the process is not completed yet, the flow returns to step S10 and the judgement process of whether or not a connection is active, is executed for a connection with a next VC value. In step S12, when it is judged that the process of step S10 is completed for all connections (all VC values), the flow proceeds to step S13.

In step S13, for a connection with a certain VC value the CPU 83 refers to the active VC storage unit 81 and judges whether or not the connection is active. If the connection is not active, the flow proceeds to step S15. If in step S13 it is judged that the connection is active, in step S14 the CPU 83 executes the expression (2) described above using a value obtained in step S11, calculates the virtual MCR value of each active connection, outputs the virtual MCR value to the virtual MCR storage unit 7 and stores it there. Then, in step S15 it is judged whether or not the process of step S13 is completed for all connections (all VC values), and if the above process is not completed for all connections yet, the flow returns to step S13 and the above process is executed for a next connection (a next VC value). If, in step S15, it is judged that the process of step S13 is completed for all connections, the virtual MCR calculation/output process of all active connections is terminated.

Figure 20:
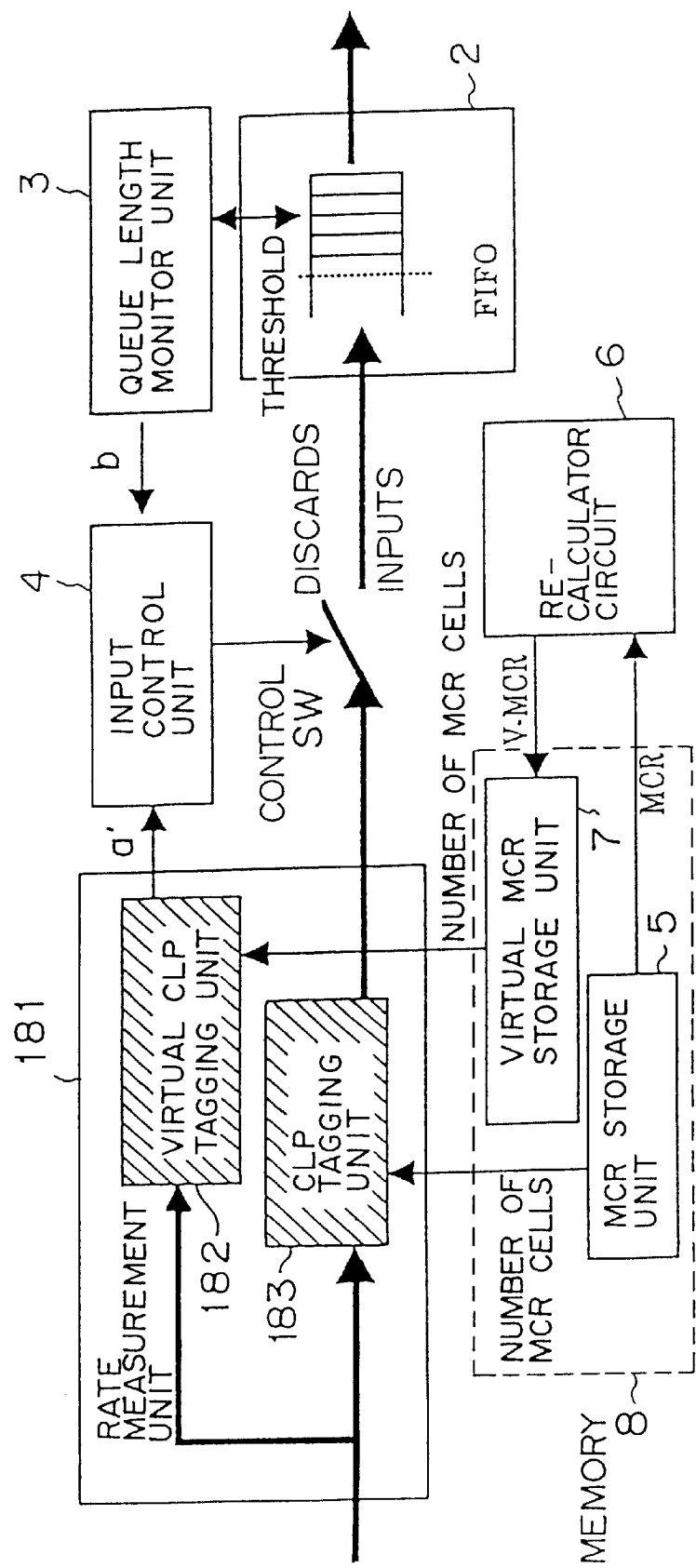
FIG. 20 shows the configuration of the eighth preferred embodiment of the present invention.

FIG. 20 shows the configuration of a rate band managing apparatus being the eighth preferred embodiment of the present invention.

In FIG. 20, the same reference numerals are attached to the same components as those shown in FIG. 3.

In the realization of a GFR using a FIFO it is general to use the tagging to the cell loss priority (CLP) bit of an ATM cell header. However, if a CLP tagging is performed using a virtual MCR, the number of cells where CLP=0, increases, since a virtual MCR value is larger than an original MCR value, which becomes one cause of network congestion. To avoid this, in this preferred embodiment an actual CLP tag set to the header of a cell outputted externally is performed using the original MCR. A virtual CLP is introduced only inside the apparatus, this virtual CLP is tagged using a virtual MCR and is used only for the input control of the FIFO.

In FIG. 20, a CLP tagging unit 183 is provided in a rate measurement unit 181, and an actual CLP tagging is performed using an original MCR value. That is, if the input rate of the cell of a certain connection exceeds an MCR value set to the connection, "1" is set to the CLP of the header of the cell, while if not, "0" is set. Furthermore, a virtual CLP tagging unit 182 is provided in the rate measurement unit 181, and a tagging is performed for a virtual CLP using a virtual MCR value. Although this result is reported to the input control unit 4 by way of rate-over information a', it is not written in the header of an actual cell. The details of the virtual CLP tagging unit 182 are described later.

The rate measurement unit 181 refers to the MCR storage unit 5, retrieves the MCR value of a connection transmitting an inputted cell, compares the MCR value with the input cell rate of the connection and sets the CLP bit of the inputted cell to "0" or "1". The virtual CLP tagging unit 182 tags the virtual CLP by using a method described later. The virtual MCR value stored in the virtual MCR storage unit 7 is calculated by the re-calculator circuit 6 referring to the MCR value in the MCR storage unit 5 using the method of one of the above-mentioned preferred embodiments. The configuration for the re-calculator circuit 6 to recognize an active connection can be any of the preferred embodiments described earlier. As described earlier, the virtual MCR value calculated by the re-calculator circuit 6 is stored in the virtual MCR storage unit 7. The virtual CLP tagging unit 182 reads the virtual MCR value of each active connection from the virtual MCR storage unit 7, detects the input cell rate of each active connection and performs the tagging of the virtual CLP, and generates rate-over information a'. That is, the rate-over information a' is generated in the virtual CLP tagging unit 182 and is inputted to the input control unit 4. The queue length monitor unit 3 for monitoring the queue length of the FIFO 2 outputs to the input control unit 4 congestion monitoring information b indicating whether or not the number of cells stored in the FIFO 2 exceeds the threshold of the FIFO 2. Based on both the rate-over information a' inputted from the virtual CLP tagging unit 182 and the congestion monitoring information b inputted from the queue length monitor unit 3, the input control unit 4 determines whether to discard the incoming cell or to input the cell to the FIFO 2 and controls the switch SW.

Since the CLP tagging unit 183 can also be, for example, a publicly known configuration based on an ATM specification recommended by ITU-T, etc., the detailed description is omitted here.

Figure 21:
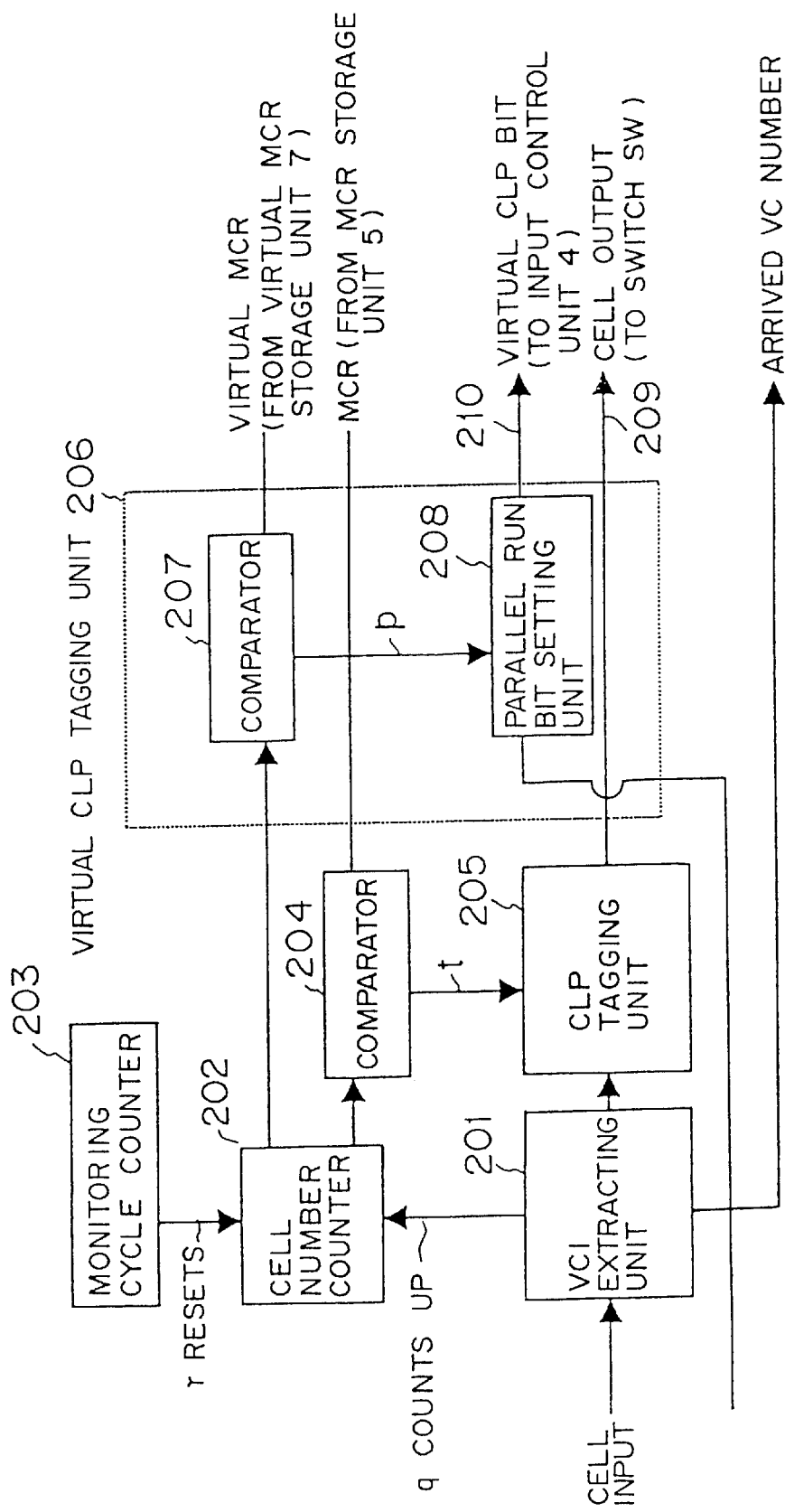
FIG. 21 shows a configuration of a virtual tagging unit shown in FIG. 20.

FIG. 21 shows a configuration of the virtual tagging unit 182 shown in FIG. 20.

In this preferred embodiment, virtual CLP bit information is stored in a parallel run bit setting unit 208 as parallel run information separately from actual input cell data. A comparator 207 compares the cell rate output of each connection inputted from a cell number counter 202, periodically reset by a monitoring cycle counter 203, with the virtual MCR value of each of the active connections inputted from the virtual MCR storage unit 7. If the input cell rate exceeds the virtual MCR value, the comparator 207 outputs a detection signal p of "1" to the parallel run bit setting unit 208, while if not, it outputs the detection signal p of "0". Every time the parallel run setting unit 208 receives a detection signal p, the unit 208 stores the value of the signal as a virtual CLP bit and outputs the signal value to the input control unit 4. If the inputted virtual CLP bit is "1", the input control unit 4 judges that the input cell rate of a connection transmitting the incoming cell exceeds the virtual MCR of the connection, controls the switch SW and discards the incoming cell. This has the same effect as that in the case where a CLP bit is substantially modified.

When a cell is inputted, a VCI extractor unit 201 obtains the VC number of the cell, outputs the VC number to the active VC storage unit 9 and simultaneously outputs to the cell number counter 202 a count-up signal q indicating that a cell is inputted. The cell number counter 202 is provided for each connection (each VC number) not clearly shown in FIG. 21, and every time the count-up signal q is inputted, the cell number counter 202 counts up the value of the counter (input cell number). The monitoring cycle counter 203 sets a time for counting an input cell rate and resets the cell number counter 202 to "0" at predetermined time intervals. According to the above-described configuration a cell number counter 202 set up individually detects the input cell rate of a corresponding connection for each connection, and outputs the input cell rates of the connections to a comparator 207 in order. Every time the cell number counter 202 completes one measurement of an input cell rate, the monitoring cycle counter 203 outputs a reset signal r to the cell number counter 202 and makes the cell number counter 202 immediately start measuring a next input cell rate. In this way, the VCI extractor unit 201 always monitors an input cell rate for each connection.

The cell number counter 202 outputs to a comparator 204 the input cell rate of each connection counted as described above. The comparator 204 inputs the MCR value of a connection transmitting the incoming cell from the virtual MCR storage unit 7 and judges whether or not the input cell rate of the connection exceeds the MCR value of the connection by comparing the input cell rate inputted from the cell number counter 202 with the MCR value. If the input cell rate exceeds the MCR value, the comparator 204 outputs the fact to a CLP tagging unit 205 using a signal t. When receiving the signal t, the CLP tagging unit 205 performs a tagging for the CLP bit of the cell header of the connection and outputs the tagged cell to the switch SW. When not receiving the signal t from the comparator 204, the CLP tagging unit 205 outputs the cell to the switch SW as it is without performing a tagging for the CLP bit of the cell inputted from the VCI extractor unit 201.

Only one comparator 204 can be provided for all connections instead of for each connection. In this case, it is necessary to provide a selector between the cell number counter 202 and the comparator 204. This selector switches over the connection between each cell number counter 202 and the comparator 204 according to an extraction VC number inputted from the VCI extractor unit 201.

The input cell rate of each connection counted by each cell number counter 202 is also inputted to the comparator 207 in a virtual CLP tagging unit 206. To the comparator 207 of the virtual CLP tagging unit 206 the virtual MCR value of each of the connections is also inputted from the virtual MCR storage unit 7. The comparator 207 compares the value of the input cell rate inputted from the cell number counter 202 with the virtual MCR value inputted from the virtual MCR storage unit 7 for each connection. If the value of the input cell rate inputted from the cell number counter 202 is greater than the virtual MCR value inputted from the virtual MCR storage unit 7, the comparator 207 reports to the parallel run bit setting unit 208 information that the incoming cell is transmitted at a rate exceeding the virtual MCR value by using a signal p. When receiving the signal p, the parallel run setting unit 208 sets a stored parallel run bit, that is, the virtual CLP bit to "1" and outputs the virtual CLP bit to the input control unit 4.

A parallel run bit is a control information bit, for example, transmitted over a wire installed in parallel with the cable over which a cell transmitted, synchronized with the transmission of the cell. Although the control information of a cell is stored in a header, there is no area for storing the virtual CLP bit, since there is currently no empty bit. It is anticipated that it becomes necessary to set up other control information in the future, besides the above-described virtual CLP bit, synchronized with a cell. For this reason, it is examined to use the parallel run bit in order to transmit such control information. Although the method of utilizing the parallel run bit is not necessarily limited to the above-described form, this preferred embodiment is configured in such a way that the transmission wire 210 of a parallel run bit is installed in a cable in parallel with the transmission wire 209 for cells, and other control information on one cell which cannot be included in the header can also be transmitted in the wire 210, synchronized with the transmission of the cell. On the receiving side the parallel run bit is received together with the cell, and the parallel run bit is used as the control information for the cell. According to the above-described configuration, a virtual CLP bit can be set in the parallel run bit setting unit 208 based on a virtual MCR value using a parallel run bit, and can be outputted to the input control unit 4 through the wire 210.

Figure 22:
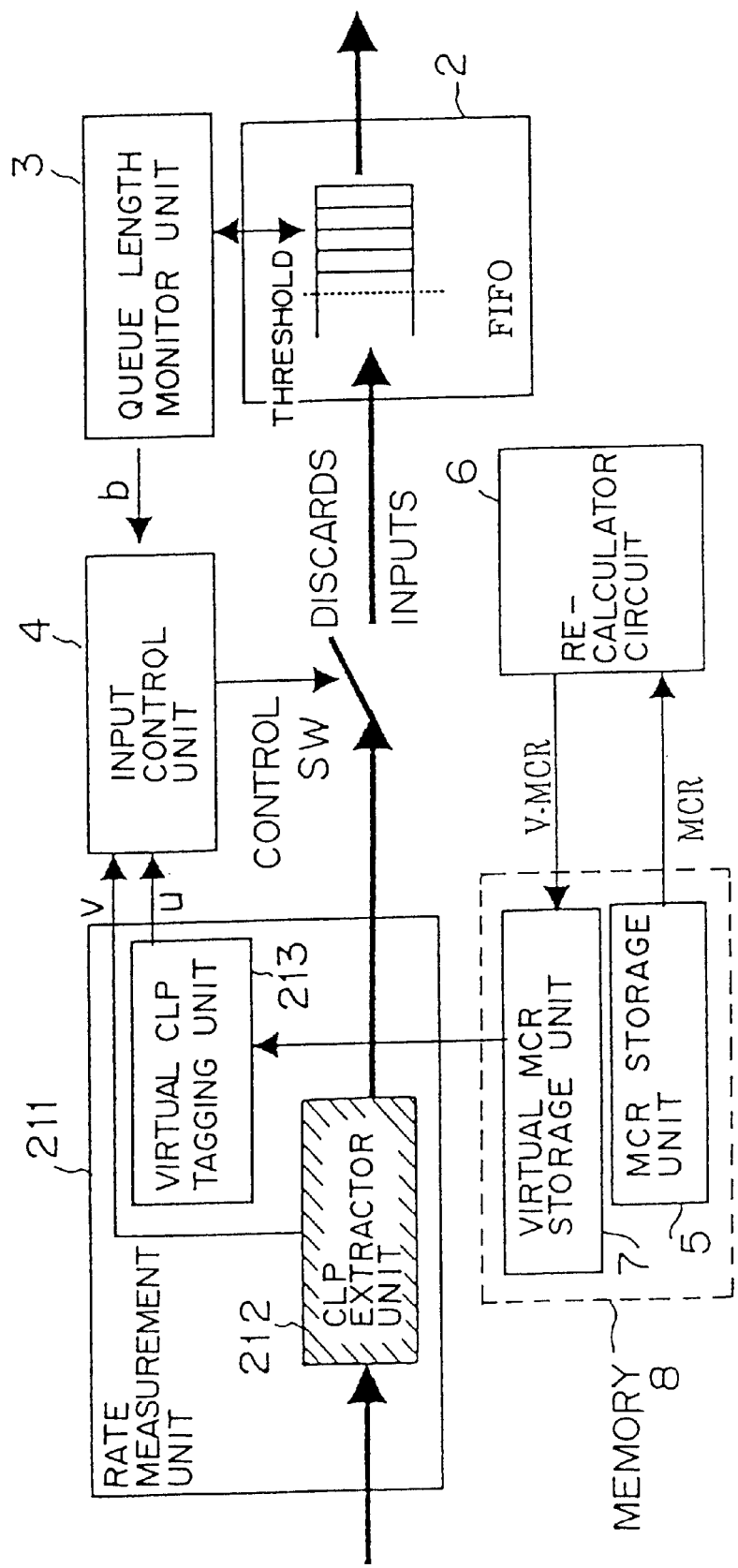
FIG. 22 shows the configuration of the ninth preferred embodiment of the present invention.

FIG. 22 shows the configuration of a rate band managing apparatus being the ninth preferred embodiment of the present invention.

In FIG. 22, the same reference numerals are attached to the same components as those shown in FIG. 3.

A GFR system includes a network in which a tagging to a CLP bit is not allowed. That is, in this system, a CLP bit has to be transferred transparently, and a cell where CLP=0 is configured not to be discarded taking the nature of a GFR into consideration, even when the network is crowded. Although the configuration of this preferred embodiment is based on that of the eighth preferred embodiment, the CLP tagging unit 183 is removed from the configuration, instead a CLP extractor unit 212 is provided, CLP information is extracted from the CLP extractor unit 212 in units of cells and the CLP information is reported to the input control unit 4. When all the following conditions (1) through (3) are met, the input control unit 4 discards cells outputted from a rate measurement unit 211.

(1) The volume of buffered cells exceeds a certain threshold.

(2) A virtual CLP is tagged.

(3) A CLP bit is "1".

For the configuration shown in FIG. 22 where the re-calculator circuit 6 detects active connections, each of the preferred embodiments described earlier can be applied as it is.

That is, the re-calculator circuit 6 for detecting an active connection reads the MCR value from the MCR storage unit 5, calculates the virtual MCR value of the active connection and stores this virtual MCR value in the virtual MCR storage unit 7. The virtual CLP tagging unit 213 of the rate measurement unit 211 reads the virtual MCR value of a connection inputted to the CLP extractor unit 212 and outputs to the input control unit 4 first tagging information u indicating whether or not a virtual CLP is tagged. The CLP extractor unit 212 obtains the CLP bit of the inputted cell and outputs to the input control unit 4 second tagging information v indicating whether or not the CLP bit is "1". As described earlier, the queue length monitor unit 3 outputs to the input control unit 4 information b (congestion monitoring information), indicating whether or not the number of cells stored in the FIFO 2 exceeds a predetermined threshold. When all the following conditions (1) through (3) are met, the input control unit 4 discards cells outputted from the rate measurement unit 211 through the switch SW. Thus, the CLP bit can be transmitted transparently without changing the CLP bit of the inputted cell, and it can be simultaneously determined whether to discard or to input the inputted cell based on both the inputted CLP bit and the virtual CLP bit. Since an inputted cell whose CLP bit is set to "0" is not discarded, this preferred embodiment is effective even when a GFR is mounted in a network where the change of the CLP bit is not allowed.

Figure 23:
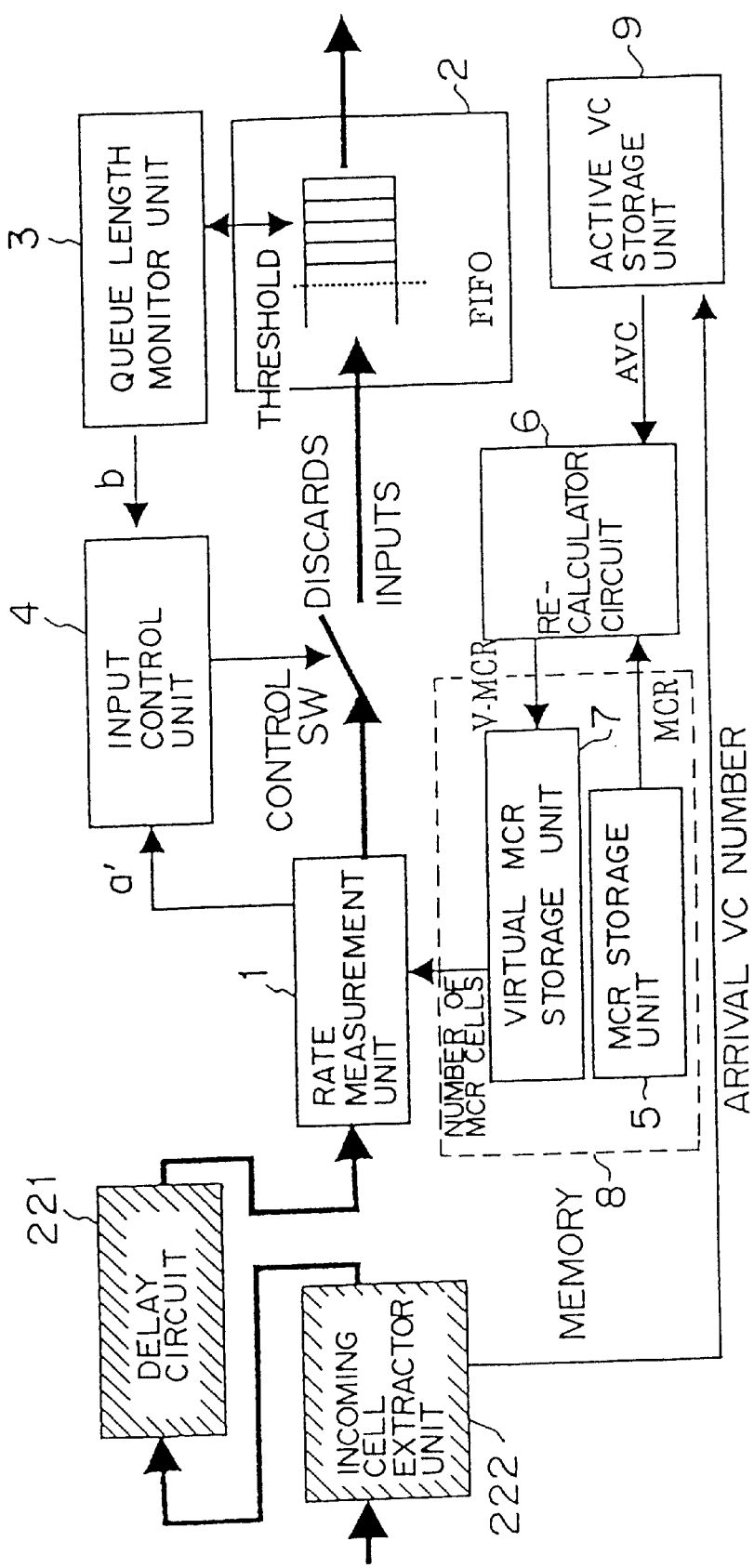
FIG. 23 shows the configuration of the tenth preferred embodiment of the present invention.

FIG. 23 shows the configuration of a rate band managing apparatus being the tenth preferred embodiment of the present invention.

In FIG. 23, the same reference numerals are attached to the same components as those shown in FIG. 4.

In the above-described second through ninth preferred embodiments, such as the second preferred embodiment shown in FIG. 4, when the contents of the active VC storage are updated by the arrival of a cell, a virtual MCR cannot be referred to before the contents of the active VC storage unit 7 are updated, the re-calculation of the virtual MCR is completed and the virtual MCR is stored in the virtual MCR storage unit 7. Therefore, from when a cell arrives at the apparatus until when the rate measurement unit 1 refers to the virtual MCR, it is necessary to delay the processing of main signals by the rate measurement unit 1 taking into consideration process delays due to the update of the active VC storage unit 9, the re-calculation of a virtual MCR value by the re-calculator circuit 6 and the update of the virtual MCR value in the virtual MCR storage unit 7, etc. For this purpose, in the preferred embodiment shown in FIG. 23, a delay circuit 221 is provided between the incoming cell extractor unit 222 and the rate measurement unit 1, and the above-described process delay time is adjusted by this delay circuit 221.

An inputted cell, first, has its VC number extracted in the incoming cell extractor unit 222, and the VC number is reported to the active VC storage unit 9. Then, the inputted cell is inputted to the delay circuit 221 and is stored in the delay circuit 221 for a predetermined time. This delay circuit 221 is, for example, a memory, and stores the inputted cell and outputs the cell after the lapse of a predetermined time. During this time, the re-calculator circuit 6 obtains the VC numbers of all active connections from the active VC storage unit 9. The re-calculator circuit 6 obtains the MCR values of all the active connections from the MCR storage unit 5 according to the obtained active connection information, calculates the virtual MCR values of all the active connections and stores the virtual MCR values in the virtual MCR storage unit 7. When the rate measurement unit 1 obtains from the virtual MCR storage unit 7 the virtual MCR value of a connection transmitting the inputted cell, the inputted cell is outputted from the delay circuit 221 and is inputted to the rate measurement unit 1. After that, as described earlier, the rate measurement unit 1 outputs rate-over information a' to the input control unit 4, and simultaneously the queue length monitor unit 3 outputs congestion monitoring information b to the input control unit 4. The input control unit 4 judges according to the information a' and b whether or not to discard the inputted cell.

The delay time of the delay circuit 221 is set to an approximate value in advance taking into consideration the access time of the active VC storage unit 9, the calculation process time of the re-calculator circuit 6, the read time of the virtual MCR value of the rate measurement unit 1, etc. and finally should be set to an appropriate value after experimenting.

In the preferred embodiment shown in FIG. 23, too, a combination of the configurations of the preferred embodiments described earlier can be used.

Figure 24:
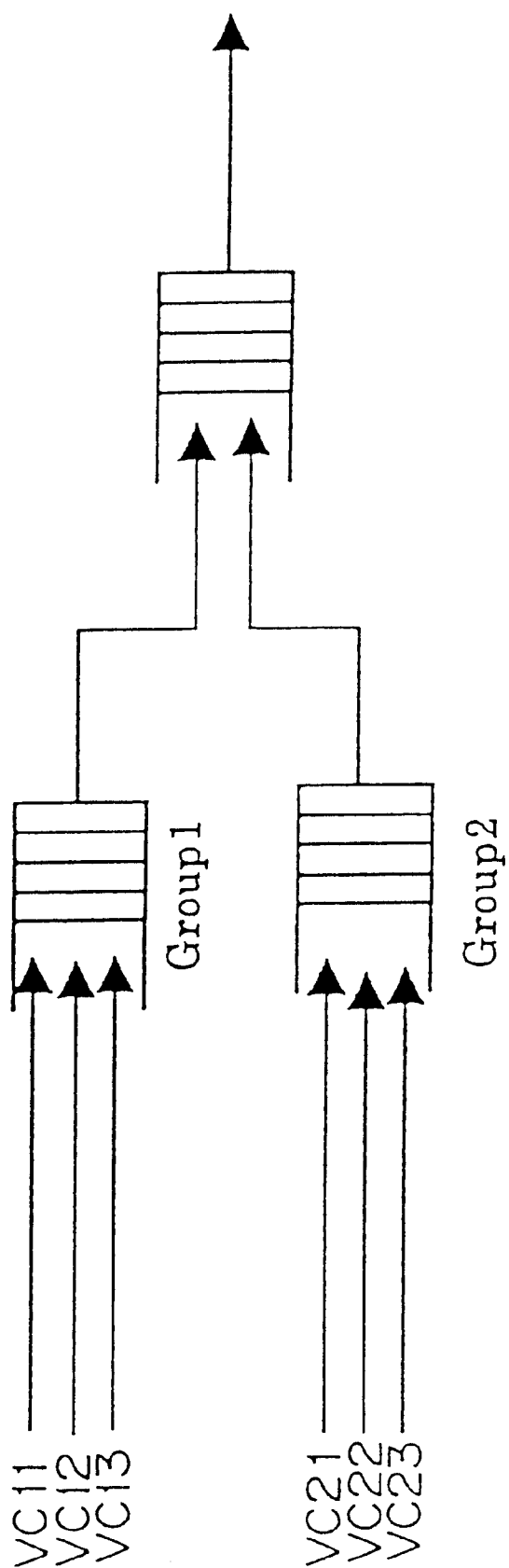
FIG. 24 shows the concept of a FIFO with a multi-stage structure.

FIG. 24 shows the concept of a FIFO with a multi-stage structure.

In the configuration of a GFR, sometimes one rate band is not shared with all connections, but all the connections are split into a plurality of groups, and one rate band is shared with each of the groups. In this case, a new rate band can also be hierarchically shared with two or more groups each of which has shared one rate band at one time as shown in FIG. 24. That is, an available rate band is detected in a group, and the available rate band is shared with connections in the group.

However, since the actual provision of multiple buffers (FIFOs) leads to an increase in the number of components, a large-scale circuitry of hardware, an increase in production cost, etc., the actual provision of multiple buffers (FIFOs) is placed at a disadvantage in terms of low cost, the miniaturization of an apparatus, etc. In this case, instead of combining two (or multiple) buffers (FIFOs), by using a virtual MCR this function can be realized with a signal stage buffer.

FIG. 25 shows a sixth configuration of a re-calculator circuit.

In FIG. 25, the same reference numerals are attached to the same components as those shown in FIG. 14.

A re-calculator circuit 230 comprises a VC-group correspondence storage unit 231 for judging a group including the connection from the VC number of an active connection, and a group read rate band storage unit 232 for calculating a read rate band corresponding to a group number obtained from the VC-group correspondence storage unit 231, and using these units, the re-calculator circuit 230 calculates the virtual MCR value of each active connection.

The virtual MCR is calculated as follows.

$$V\text{-}MCRi = GROUPRATEj \times MCRi/(\text{sum of } MCRi)j \quad (3)$$

where
GROUPRATEj: Read rate of j-th group
(sum of MCRi)j: Sum of MCRs of all active connections in j-th group
Other symbols indicate the same parameters as those of the above-described expression (1).

That is, an active MCR reference unit 53 obtains the VC number of each active connection from an active VC storage unit 42 and reads the MCR value of the active connection using the VC number from the MCR storage unit 5. The active MCR reference unit 53 also outputs to the VC-group correspondence storage unit 231 the VC number of an active connection obtained from the active VC storage unit 9. The VC-group correspondence storage unit 231 outputs to the group read rate band storage unit 232 the group number of a group to which an active connection with the inputted VC number belongs. The group read rate band storage unit 232 outputs to a multiplier 59 a rate band allocated to a group with the inputted group number. On the other hand, the MCR value of an active connection read from the MCR storage unit 5 is inputted to both a MCR accumulator 54 and a divider 57. The MCR accumulator 54 calculates the sum of the MCR values of the active connections for each group by accumulating and adding the inputted MCR values of the active connections for each group in order, and outputs the calculation result to the divider 57. The divider 57 calculates a ratio of the MCR value of the individual active connection in each of the groups to the sum of the MCR values of the active connections of a group to which the MCR value of the individual active connection calculated by dividing the MCR value of the individual active connection in each of the groups inputted from the MCR storage unit 5 by the sum of the MCR values of the active connections in each group, and outputs the calculation result to a multiplier 59. The multiplier 59 calculates the virtual MCR value of the individual active connection in each group for each group by multiplying the calculation result of a divider 57 by the read rate band of the group read from a group read rate band storage unit 232, outputs the virtual MCR value to the virtual MCR storage unit 7 and stores it there.

In this way, by logically grouping connections and calculating the virtual MCR value of the individual active connection of each group in this grouped rate band, the virtual MCR value can be obtained without hierarchically providing a multiplicity of buffers in a system where a single stage buffer is provided, connections are split into a plurality of groups and one rate band is shared with the active connections of each individual group.

Figure 26:
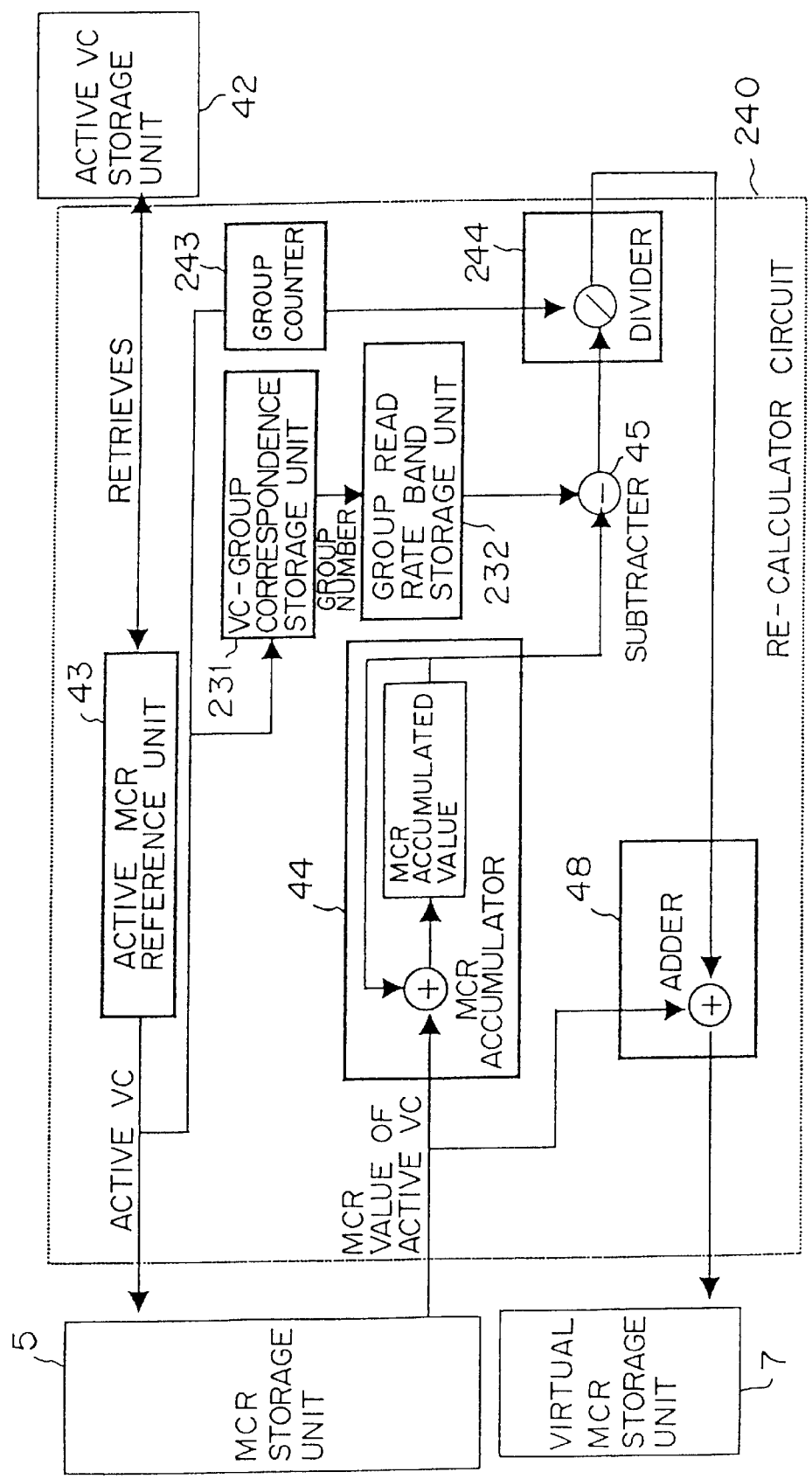
FIG. 26 shows a seventh configuration of a re-calculator circuit.

FIG. 26 shows a seventh configuration of a re-calculator circuit.

In FIG. 26, the same reference numerals are attached to the same components as those shown in FIG. 13.

This configuration, like the sixth configuration described above, comprises a VC-group correspondence storage unit 231 for identifying groups, and a group read rate band storage unit 232. It further comprises a group counter 234 for counting the number of active connections in units of groups, and evenly distributes the available rate band of a group among the active connections of the group for each group.

The virtual MCR value to be calculated in this configuration is expressed as follows. The same parameters are indicated by the same symbols as those described in the sixth configuration described earlier.

$$V\text{-}MCRi = MCRi + (GROUPRATEj - \text{sum of } MCRi)/Nj$$

Nj: number of active connections in group j

An active MCR reference unit 43 refers to the active VC storage unit 42 and obtains the VC numbers of all active connections. The active MCR reference unit 43 outputs each of the VC numbers to the MCR storage unit 5 and reads the MCR values of the active connections with each of the VC numbers from the MCR storage unit 5. On the other hand, the active MCR reference unit 43 outputs each of the VC numbers to both the VC-group correspondence storage unit 231 and the group counter 243. The VC-group correspondence storage unit 231 outputs to the read rate band storage unit 232 the group number of a group to which an active connection with each of the inputted VC numbers belongs. The group read rate band storage unit 242 outputs to a subtracter 45 the read rate band of a group with the inputted group number. On the other hand, the group counter 243 comprises a counter for counting the number of the active connections in each of the groups provided corresponding to each group, and judges a group to which an active connection of the VC number from a VC number inputted from the active MCR reference unit 43 belongs and makes a counter corresponding to the group count the number of the active connections in the group. In this way, the number of the active connections in each group is counted by a counter corresponding to each of the groups, and the calculation result is outputted to a divider 244.

On the other hand, the MCR value read from the MCR storage unit 5 is inputted to both an MCR accumulator 44 and an adder 48. The MCR accumulator 44 calculates the sum of the MCR values of all the active connections in the group by accumulating and adding the MCR value of each active connection inputted from the MCR storage unit 5 for each group in order, and outputs the calculation result to the subtracter 45. The subtracter 45 calculates the available rate band of each of the groups by subtracting the sum of the MCR values of all the active connections in each of the groups inputted from the MCR accumulator 44 from the read rate band of each group inputted from the group read rate band storage unit 232, and outputs the available rate band of each of the groups to the divider 244. The divider 244 calculates the value of the available rate band of each of the group which is evenly distributed to each active connection of each of the groups, by dividing the available rate band of each of the groups inputted from the subtracter 45 by the total number of the active connections in each of the groups inputted from the group counter 243, and outputs the calculated value to the adder 48. The adder 48 calculates the virtual MCR value of the individual active connection in each of the groups by adding the evenly distributed value of the available rate band in each of the groups which is inputted from the divider 244 and the MCR value of the individual active connection in each of the groups inputted from the MCR storage unit 5. The adder 48 outputs this virtual MCR value of the individual active connection to the virtual MCR storage unit 7 and stores it there.

The MCR accumulator 44, subtracter 45, adder 48 and divider 244 can also be provided individually.

Although in the configurations shown in FIGS. 25 and 26 it is assumed that the re-calculator circuit 6 is configured by way of hardware, as shown in the configuration shown in FIG. 17, the re-calculator circuit 6 can also be configured by way of software.

According to this preferred embodiment described earlier, in the realization of a GFR service class using a FIFO, an available rate band can be impartially shared in a manner equivalent to a buffer system of individually providing a buffer for each connection. Since in this preferred embodiment the structure of a buffer is simple compared with the individual buffer system, and also a buffer can be shared among a plurality of connections, this seventh preferred embodiment has an advantage that a buffer capacity can be reduced.

According to the present invention, since an available rate band can be distributed among active connections according to the use condition of network resources, the communication rate band of a communication network can be effectively used. In particular, since conventionally an available rate band is not managed, sometimes all of the available rate band is occupied by one connection. However, by distributing an available rate band among the active connections using a predetermined method such as that disclosed in the present invention, the available rate band can be impartially shared among the active connections.

What is claimed is:

1. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections;

an active connection storing unit storing information on active connections currently used in an actual communication; and a managing unit monitoring data communications of each connection and deleting from said active connection storing unit connections in which data communications are not conducted for more than a predetermined period.

2. The rate band managing apparatus according to claim 1, wherein said managing unit comprises:

a timer unit, provided corresponding to each connection, for providing a time out signal when each of connections does not transmit data for more than a predetermined period; and a deleting unit deleting a connection from said active connection storing unit corresponding to a time-out signal from the timer unit.

3. The rate band managing apparatus according to claim 1, further comprising:

a FIFO type memory for storing transmitted data and transmitting the data at predetermined intervals;

measuring means for measuring a data volume of each connection staying in the FIFO type memory; and deleting means for deleting a registration of the connection whose value measured by the measuring means become 0.

4. The rate band managing apparatus according to claim 1, further comprising:

reporting means for when there is a change in stored information of said active connection storing means, reporting the change to said re-calculating means, wherein said re-calculating means receives a notice and performs the calculation described above.

5. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections;

an active connection storing unit storing information on active connections currently used in an actual communication; and wherein said communication network is an ATM communication network for transmitting cells after splitting a packet containing data into a plurality of cells, further comprising:

a detecting unit detecting a cell containing a tail of the packet; and a deleting unit deleting connections transmitting the cell containing the tail of the packet detected by the detecting unit from said active connection storing unit.

6. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections;

an active connection storing unit storing information on active connections currently used in an actual communication; and wherein said communication network provides a TCP protocol service as a higher-order layer protocol of an ATM data transfer protocol, further comprising:

an extracting unit extracting a header of an inputted TCP datagram;

a registering unit, when a TCP connection commencement signal is detected from the header extracted by the extracting unit, judging that a communication of the connection is started, and storing the connection in said active connection storing unit as an active connection; and a deleting unit, when a TCP connection release signal is detected from the header extracted by the extracting unit, judging that the communication of the connection is completed, and deleting the connection from said active connection storing unit.

7. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections; and a reporting unit detecting a communication commencement of a new connection or a communication completion of a certain connection and reporting this to said re-calculating unit, wherein said re-calculating unit performs said re-calculation when receiving this report.

8. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule; and a controlling unit guaranteeing a minimum cell rate for each of the connections using the minimum virtual rate band of each of the connections, wherein said re-calculating unit calculates a minimum virtual rate band of each of connections in such a way that a rate band obtained by subtracting a sum of minimum cell rates of all connections in communication from its own rate band allowed by its own apparatus, may be evenly distributed among all the connections in communication.

9. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule; and a controlling unit guaranteeing a minimum cell rate for each of the connections using the minimum virtual rate band of each of the connections, wherein said re-calculating unit calculates in such a way that a minimum virtual rate band of a connection in communication may become a value obtained by distributing its own rate band allowed by its own apparatus in proportion to a ratio of the minimum cell rate guaranteed to the connection in communication to a sum of the minimum cell rates of all connections in communication.

10. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule; and a controlling unit guaranteeing a minimum cell rate for each of the connections using the minimum virtual rate band of each of the connections, wherein said re-calculating unit further comprises:

a first re-calculating unit calculating the minimum virtual rate band of each connection in communication in such a way that a rate band obtained by subtracting a sum of minimum cell rates of all connections in communication from its own rate band allowed by its own apparatus can be evenly distributed among all the connections in communication;

a second re-calculating unit calculating in such a way that the minimum virtual rate band of the connection in communication may become a value obtained by distributing its own rate band allowed by its own apparatus in proportion to a ratio of the minimum cell rate guaranteed to the connection in communication to the sum of the minimum cell rates of all the connections in communication; and a switching unit switching over outputs of said first and second re-calculating units by way of an external input.

11. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule; and a controlling unit guaranteeing a minimum cell rate for each of the connections using the minimum virtual rate band of each of the connections, wherein said re-calculating unit comprises:

a storing unit storing minimum virtual rate bands corresponding to information obtained from a combination of a rate band allowed by its own apparatus, a minimum guaranteed rate band of a connection in communication, and a sum of the minimum guaranteed rate bands of all connections in communication; and an outputting unit outputting a minimum virtual cell rate of each connection in communication by reading contents stored in the storing unit.

12. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections; and a virtual cell loss priority (CLP) tagging unit transmitting as parallel run information a virtual cell loss priority (CLP) bit tagged to data inputted at a rate exceeding a minimum virtual rate band in such a way as to indicate that the data exceed the minimum virtual rate band of a connection transmitting the data.

13. The rate band managing apparatus according to claim 12, wherein said communication network is an ATM communication network and comprises:

a FIFO type memory for temporarily storing inputted cells; and an input controlling unit discarding an inputted cell to prevent the inputted cell from being inputted to the FIFO type memory when a CLP bit of the inputted cell is "1", the virtual CLP bit is tagged, and a queue length of the FIFO type memory exceeds a certain threshold.

14. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections;

an extracting unit extracting incoming data; and a delaying unit delaying a flow of data inputted from said extracting unit by a period from when the extracting unit extracts the data until when said controlling unit judges whether or not the data are transmitted at a rate exceeding a minimum cell rate of a connection transmitting the data.

15. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule; and a controlling unit guaranteeing a minimum cell rate for each of the connections using the minimum virtual rate band of each of the connections, wherein when a rate band is managed by splitting a plurality of connections into a plurality of groups, said re-calculating unit calculates a minimum virtual rate band of each connection in such a way that a rate band of a group to which each of the connections belongs, can be distributed among connections in communication in the group in proportion to a minimum cell rate.

16. A rate band managing apparatus for guaranteeing a minimum cell rate for each connection accommodated in a communication network, comprising:

a re-calculating unit calculating a minimum virtual rate band of each of connections by re-calculating a minimum cell rate value to be guaranteed for each connection according to a predetermined rule;

a controlling unit guaranteeing a minimum cell rate for each of the connections using the minimum virtual rate band of each of the connections, wherein when a rate band is managed by splitting a plurality of connections into a plurality of groups, said re-calculating unit calculates a minimum virtual rate band of a connection in communication in such a way that a rate band obtained by subtracting a sum of minimum cell rates of connections in communication in a group from a read rate band allocated to the group to which each of connections belongs, can be evenly distributed among the connections in the group.

17. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein in step (a), a minimum virtual rate band of an active connection is calculated using a minimum cell rate guaranteed to an active connection currently used in an actual communication, and wherein in step (a), data communication of each connection is monitored, and except connections in which data communication is not conducted for more than a predetermined period, a minimum virtual rate band is re-calculated for active connections currently used in communication.

18. The rate band managing method according to claim 17, wherein step (a) further comprises:

(c) counting down a timer individually provided corresponding to each connection in such a way that the timer may time out when each of connections does not transmit data for more than a predetermined period; and (d) deleting a connection corresponding to the time-outed timer from active connections by using a time-out notice generated in step (c).

19. The rate band managing method according to claim 18, wherein step (c) counts down a corresponding timer for each connection while data are not received and resets the corresponding timer every time data are received and step (d) deletes connections timed out by the corresponding timer from active connections.

20. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein in step (a), a minimum virtual rate band of an active connection is calculated using a minimum cell rate guaranteed to an active connection currently used in an actual communication, and wherein said communication network is an ATM communication network for transmitting cells after splitting a packet containing data into a plurality of cells, and step (a) further comprises a step that detects a cell containing a tail of the packet and deletes from active connections a connection transmitting the cell containing the tail of the packet.

21. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein said communication network provides a TCP protocol service as a higher-order layer protocol of an ATM data transfer protocol, and step (a) further comprises a step that extracts a header of a TCP datagram, registers a connection as an active connection when a TCP connection signal is detected, and deletes the connection from active connections when a TCP connection release signal is detected.

22. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule;

(b) guaranteeing the minimum cell rate of the connection using the minimum virtual rate band; and (c) detecting a communication commencement of a new connection or a communication completion of a certain connection, wherein upon each detecting a communication commencement of a new connection or upon detecting a communication completion of a certain connection execute step (a) for each detection.

23. A rate band managing method of guaranteeing a minimum cell rate for each connection accommodated in a communication in a network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein step (a) further comprises a step that calculates a minimum virtual rate band in such a way that a rate band obtained by subtracting a sum of minimum cell rates of all connections in communication from its own rate band allowed by its own apparatus can be evenly distributed among connections in communication.

24. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein step (a) further comprises a step that calculates in such a way that a minimum virtual rate band of a connection in communication can become a value obtained by distributing its own rate band allowed by its own apparatus in proportion to a ratio of a minimum cell rate guaranteed to the connection in communication to a sum of the minimum cell rates of all connections in communication.

25. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein step (a) comprises:

(e) calculating a minimum virtual rate band of each connection in communication in such a way that a rate band obtained by subtracting a sum of minimum cell rates of all connections in communication from its own rate band allowed by its own apparatus, can be evenly distributed among all the connections in communication;

(f) calculating in such a way that the virtual minimum cell rate of a connection in communication may become a value obtained by distributing its own rate band allowed by its own apparatus in proportion to a ratio of a minimum cell rate guaranteed to the connection in communication to the sum of the minimum cell rates of all the connection in communication; and (g) calculating the minimum virtual rate band selectively using either of the steps (e) or (f).

26. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule: and (b) guaranteeing the minimum cell rate of the connection using the minimum virtual rate band, wherein step (a) further comprises a step that stores in advance a virtual minimum cell rate in a storing unit corresponding to information obtained from a combination of a full rate band allowed by a communication network, a minimum guaranteed rate band of a connection in communication, and a sum of the minimum guaranteed rate bands of connections in communication and outputting the minimum virtual rate band of each connection in communication by reading the contents of the storing unit.

27. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule;

(b) guaranteeing the minimum cell rate of the connection using the minimum virtual rate band; and (c) transmitting to data inputted from a certain connection at a rate exceeding a virtual minimum cell rate as a parallel run information, a cell loss priority (CLP) bit tagged in such a way as to indicate that the data exceed a minimum virtual rate band of a connection transmitting data.

28. The rate band managing method according to claim 27, wherein said communication network is an ATM communication network, and when a minimum cell rate guaranty of a plurality of connections are made by way of shaping by a FIFO type memory, and when the CLP bit of a certain inputted cell is "1", a virtual CLP bit is tagged and further a queue length of the FIFO type memory exceeds a certain threshold, the inputted cell is not inputted to the FIFO type memory and is discarded.

29. A rate managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band; and (c) delaying a flow of data for a period from when a communication commencement is detected by an arrival of the data until when it is judged whether or not the data are transmitted at a rate exceeding a minimum cell rate of a connection transmitting the data.

30. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein when a rate band is managed by splitting a plurality of connections into a plurality of groups, step (a) further comprises a step that calculates a virtual minimum cell rate of each connection in such a way that a rate band of a group to which each of the connections belongs, can be distributed among connections in communication in the group in proportion to the minimum cell rate.

31. A rate band managing method of guaranteeing a minimum cell rate for each connection accommodated in a communication network, comprising:

(a) calculating a minimum virtual rate band of each of connections by re-calculating a value of a minimum cell rate guaranteed to each connection according to a predetermined rule; and (b) guaranteeing the minimum cell rate of the connection using the minimum virtual rate band, wherein when a rate band is managed by splitting a plurality of connections into a plurality of groups, step (a) further comprises a step that calculates a virtual minimum cell rate of each connection in such a way that a rate band obtained by subtracting a sum of minimum cell rates of connections in communication in a group from a read rate band allocated to the group to which each of the connection belongs, can be evenly distributed among the connections.

32. A rate band managing apparatus, comprising:

MCR storing means for storing for each connection a value of a minimum cell rate (MCR value) reported by a user;

re-calculating means for calculating a minimum virtual rate band (virtual MCR value) of each of active connections from a minimum cell rate of each active connection in communication stored in the MCR storing means;

virtual MCR storing means for storing the minimum virtual rate band of each of the active connections calculated by the re-calculating means;

rate measuring means for measuring a cell rate of an inputted cell for each connection, comparing the minimum virtual rate band of each of the active connections stored in the virtual MCR storing means with the measured cell rate of each of the active connections and outputting information on whether or not the cell rate exceeds the minimum virtual rate band of each of the active connections;

switch means for determining whether to discard a cell passing through the rate measuring means or to let the cell to pass through as it is;

a FIFO type memory for temporarily storing a cell passing through the switch means and transmitting the cell at a specific rate;

queue length monitoring means for outputting information on whether or not a total number of cells stored in the FIFO type memory exceeds a predetermined threshold; and input controlling means for inputting both output information of the rate measuring means and output information of the queue length monitoring means, and controlling the switch means.

33. The rate band managing apparatus according to claim 32, further comprising:

active VC storing means for inputting a VC number (VC identifier information) of a cell inputted to a rate measuring means and registering an active connection based on the VC number.

34. The rate band managing apparatus according to claim 33, further comprising:

timer means provided for each connection, for when an active connection stored in said active VC storing means does not communicate for more than a predetermined period, timing out the active connection and deleting the time-outed active connection from the active VC storing means.

35. The rate band managing apparatus according to claim 34, wherein each of said timers means is reset every time a connection corresponding to said active VC storing means is registered as an active connection, starts counting every time the timer means is reset, and when the timer means times out, deletes a corresponding connection from the active VC storing means.

36. The rate band managing apparatus according to claim 33, further comprising:

first VC number extracting means for extracting a first VC number of a first cell inputted to said FIFO type memory and registering a connection with the first VC number in said active VC storing means as an active connection;

second VC number extracting means for outputting a second VC number of a second cell outputted from the FIFO type memory; and cell number counting means for counting up a counter value corresponding to a connection with the registered first VC number when an active connection is registered in the active VC storing means by said first VC number extracting means, counting down a count value corresponding to the VC number when the second VC number is inputted from the second VC number extracting means, and deleting from said VC number storing means connections with a VC number whose corresponding count values become "0".

37. The rate band managing apparatus according to claim 33, wherein every time a cell arrives, said rate measuring means reports a VC number of the cell to said active VC storing means as an incoming VC number, simultaneously after a cell for reporting a termination of a communication arrives, reports a VC number of the cell from the active VC storing means as a termination VC number, registers a connection with the VC number reported by the incoming VC number notice in the active VC storing means as an active connection, and deletes the connection with the VC number reported by the termination VC number notice from the registration of active connections.

38. The rate band managing apparatus according to claim 37, wherein said rate measuring means comprises:

PTI extracting means for extracting a PTI of an inputted cell;

comparing means for judging whether or not the PTI extracted by the PTI extracting means indicates a tail of a packet and if the extracted PTI indicates the tail of the packet, outputting to said active VC storing means a signal for announcing the transmission of said termination VC number notice; and VCI extracting means for extracting a VC number of the inputted cell and outputting the VC number to said active VC storing means as said incoming VC number.

39. The rate band managing apparatus according to claim 33, further comprising:

leading datagram extracting means for inputting a cell which accommodates a split datagram and reporting a VC number set up in the cell, to said active VC storing means as an arrival VC number and a termination VC number when the inputted cell contains a head and a tail, respectively, of the TCP datagram, wherein said active VC storing means registers a connection with a VC number reported by the arrival VC number, as an active connection, and deletes a VC number reported by the termination VC notice from the registration of active connections.

40. The rate band managing apparatus according to claim 39, wherein said leading datagram extracting means comprising:

cell head extracting means for extracting a head of an inputted cell;

time counting means for counting a number of predetermined first and second bits from the head of the inputted cell and outputting a latch signal every time the number of the predetermined first and second bits is counted;

latch means for storing a SYN signal and a FIN signal set up in the inputted cell when receiving the latch signal from the time counting means, and outputting the SYN and FIN signals to said active VC storing means as signals for said arrival VC number and terminal VC notice, respectively; and VCI extracting means for extracting a VC number of the inputted cell and outputting the VC number to said active VC storing means.

41. The rate band managing apparatus according to claim 33, wherein when an active connection becomes non-active or a non-active connection becomes active, said active VC storing means outputs a trigger notice for instructing said re-calculating means to perform a calculation of a minimum virtual rate band of each of said active connections.

42. The rate band managing apparatus according to claim 33, wherein said re-calculating means comprises:

active MCR referring means for obtaining a VC number of an active connection from said active VC storing means and reading an MCR value of the active connection from said MCR storing means;

counting means for counting a total number of VC numbers of active connections obtained by the active MCR referring means;

MCR accumulating means for calculating accumulated values of the MCR values of all active connections read by the MCR storing means;

subtracting means for subtracting the accumulated values of the MCR values inputted from the MCR accumulating means from a read rate band of said FIFO type memory means;

dividing means for dividing the subtracted values obtained by the subtracting means by the VC numbers of the active connections counted by the counting means; and adding means for adding the MCR value of an individual active connection read by the MCR storing means and the divided value obtained by the dividing means, outputting the addition result as a minimum virtual rate band of the individual active connection to said virtual MCR storing means and storing the addition result as the minimum virtual rate band of the individual active connection in said virtual MCR storing means.

43. The rate band managing apparatus according to claim 33, wherein said re-calculating means comprises:

active MCR referring means for obtaining a VC number of an active connection from said active VC storing means and reading an MCR value of the active connection from said MCR storing means;

MCR accumulating means for calculating accumulated values of the MCR values of all the active connections read by the MCR storing means;

dividing means for dividing the MCR value of the individual active connection read from the MCR storing means by the accumulated value inputted from the MCR accumulating means; and multiplying means for multiplying the divided value obtained by the dividing means by the read rate band of said FIFO type memory means, outputting the multiplication result to said virtual MCR storing means as the minimum virtual rate band of the individual active connection and storing the multiplication result in said virtual MCR storing means as the minimum virtual rate band of the individual active connection.

44. The rate band managing apparatus according to claim 33, wherein said re-calculating means comprises:

available rate band even distribution circuit comprising:
active MCR referring means for obtaining a VC number of an active connection from said active VC storing means and reading an MCR value of the active connection from said MCR storing means;

counting means for counting a total number of VC numbers of active connections obtained by the active MCR referring means;

MCR accumulating means for calculating accumulated values of the MCR values of all the active connections read by the MCR storing means;

subtracting means for subtracting the accumulated values of the MCR values inputted from the MCR accumulating means from a read rate band of said FIFO type memory means;

dividing means for dividing the subtracted values obtained by the subtracting means by the VC numbers of the active connections counted by the counting means; and adding means for adding the MCR value of the individual active connection read by the MCR storing means and the divided value inputted from the dividing means, outputting the addition result as a minimum virtual rate band of the individual active connection to said virtual MCR storing means and storing the addition result as the minimum virtual rate band of the individual active connection in said virtual MCR storing means, MCR proportional distribution circuit comprising:

MCR accumulating means for calculating accumulated values of the MCR values of all the active connections read by the MCR storing means;

dividing means for dividing the MCR value of the active connection read from the MCR storing means by the accumulated value inputted from the MCR accumulating means;

multiplying means for multiplying the divided value obtained by the dividing means by the read rate band of said FIFO type memory means, outputting the multiplication result to said virtual MCR storing means as the minimum virtual rate band of the individual active connection and storing the multiplication result in said virtual MCR storing means as the minimum virtual rate band of the individual active connection, and selecting means for selectively outputting an output of said available rate band even distribution circuit and an output of said MCR proportional distribution circuit according to an input of a selection signal.

45. The rate band managing apparatus according to claim 33, wherein said re-calculating means comprises:

active MCR referring means for obtaining a VC number of an active connection from said active VC storing means and reading an MCR value of the active connection from said MCR storing means;

MCR accumulating means for calculating accumulated values of the MCR values of all the active connections read by the MCR storing means; and storing means for storing a virtual MCR value corresponding to information obtained from a combination of an MCR value of an active connection, the accumulated value and the read rate band of said FIFO type memory means, outputting a minimum virtual rate band of the active connection to said virtual MCR storing means according to an input of data on the MCR value of the active connection, the accumulated value inputted from the MCR accumulating means and the read rate band of the FIFO type memory means, memory and storing the minimum virtual rate band of the active connection in said virtual MCR storing means according to the input of the data on the MCR value of the active connection, the accumulated value inputted from the MCR accumulating means and the read rate band of the FIFO type memory means.

46. The rate band managing apparatus according to claim 33, further comprising:

incoming cell extracting means for extracting a VC number of an inputted cell; and delaying means for delaying a cell which has passed through the incoming cell extracting means for a predetermined period and outputting the cell.

47. The rate band managing apparatus according to claim 33, wherein said re-calculating means comprises:

active MCR referring means for obtaining a VC number of an active connection from said active VC storing means and reading an MCR value of the active connection from said MCR storing means;

VC-group correspondence storing means for every time a VC number is inputted from the active MCR referring means, storing a group number to which each of connections with each VC number belongs and outputting a group number of a group to which an active connection with the VC number belongs;

group read rate band storing means for outputting a read rate band of the group with the group number according to the group number read from the VC-group correspondence storing means;

MCR accumulating means for inputting the MCR value read from said MCR storing means by the active MCR referring means, and calculating an accumulated value of the MCR values of all active connections for each of said groups;

dividing means for dividing the MCR value of the individual active VC of each group read from the MCR storing means by the accumulated value of each of the groups calculated by the MCR accumulating means; and multiplying means for multiplying the divided value of the individual active connection in each of the groups inputted from the dividing means by the read rate band of each of the groups inputted from the group read rate band storing means, outputting the multiplication result to said virtual MCR storing means as a virtual MCR of the individual active connection and storing the result in the virtual MCR storing means as the virtual MCR of the individual active connection.

48. The rate band managing apparatus according to claim 33, wherein said re-calculating means comprises:

active MCR referring means for obtaining a VC number of an active connection from said active VC storing means and reading an MCR value of the active connection from said MCR storing means;

VC-group correspondence storing means for every time a VC number is inputted from the active MCR referring means, storing a group number to which each connection with each VC number belongs, and outputting a group number of a group to which an active connection with the VC number belongs;

group read rate band storing means for outputting a read rate band of the group with the group number according to the group number read from the VC-group correspondence storing means;

MCR accumulating means for inputting the MCR value read from said MCR storing means by the active MCR referring means, and calculating an accumulated value of the MCR values of all active connections for each of said groups;

counting means for inputting the VC number read from said active VC storing means by the active MCR referring means, and counting a total number of the active connections for each of said groups;

subtracting means for calculating a subtracted value by subtracting the accumulated value of all the active connections in each of said groups inputted from the MCR accumulating means from the read rate band of each of said groups inputted from the group read rate band storing means;

dividing means for dividing an available rate band of each of said groups inputted from the subtracting means by the total number of the active connections in each of said groups inputted from the counting means; and adding means for adding the divided value inputted from the dividing means and the MCR value of the individual active connection in each of said groups read from the MCR storing means by the active MCR referring means, and outputting and storing the addition result to said virtual MCR storing means as a virtual MCR of the individual active connection in each of said groups.

49. The rate band managing apparatus according to claim 32, wherein said rate measuring means comprises:

cell loss priority (CLP) tagging means for performing a tagging for a cell loss priority (CLP) bit of a head of an inputted cell; and virtual cell loss priority (CLP) tagging means for performing a tagging for a virtual cell loss priority (CLP) bit of the inputted cell based on said virtual MCR value of a connection with a VC number set up in the inputted cell which is read from a virtual MCR storing means, and outputting information of the virtual cell loss priority (CLP) bit as parallel run bit information of the inputted cell.

50. The rate band managing apparatus according to claim 49, wherein said virtual CLP tagging means comprises:

VCI extracting means for extracting a VC number of an inputted cell;

cell rate counting means for counting an input cell rate of a connection with the VC number every time the VCI extracting means extracts a VC number;

comparing means for comparing the input cell rate value of each connection counted by the cell rate counting means with a virtual MCR value of each of connections stored in said virtual MCR storing means; and parallel run bit setting means for performing a tagging for a virtual CLP bit of an inputted cell of each of the connections based on the comparison result of the comparing means.

51. The rate band managing apparatus according to claim 49, wherein said virtual CLP tagging means comprises:

VCI extracting means for extracting a VC number of an inputted cell;

cell rate counting means for counting an input cell rate of a connection with the VC number every time the VCI extracting means extracts a VC number;

monitoring cycle counting means for resetting the cell number counting means at a predetermined time;

comparing means for comparing the counted value of a number of cells of each connection counted by the cell number counting means with a virtual MCR value of each of connections stored in said virtual MCR storing means; and parallel run bit setting means for performing a tagging for a virtual CLP bit of the inputted cell based on the comparison result of the comparing means and outputting information of the virtual CLP bit as parallel running bit information of the inputted cell.

* * * * *